(12) United States Patent
Li

(10) Patent No.: US 11,973,561 B2
(45) Date of Patent: Apr. 30, 2024

(54) ANTENNA PANEL APPLICATION METHOD, APPARATUS AND STORAGE MEDIUM

(71) Applicant: BEIJING XIAOMI MOBILE SOFTWARE CO., LTD., Beijing (CN)

(72) Inventor: Mingju Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 64 days.

(21) Appl. No.: 17/606,429

(22) PCT Filed: Apr. 26, 2019

(86) PCT No.: PCT/CN2019/084669
§ 371 (c)(1),
(2) Date: Oct. 25, 2021

(87) PCT Pub. No.: WO2020/215335
PCT Pub. Date: Oct. 29, 2020

(65) Prior Publication Data
US 2023/0080333 A1   Mar. 16, 2023

(51) Int. Cl.
*H04B 7/08* (2006.01)
*H04B 7/0404* (2017.01)
(Continued)

(52) U.S. Cl.
CPC ......... *H04B 7/0802* (2013.01); *H04B 7/0404* (2013.01); *H04B 7/0602* (2013.01);
(Continued)

(58) Field of Classification Search
CPC ...... H04B 7/0404; H04B 7/0456; H04B 7/06; H04B 7/0602; H04B 7/0623;
(Continued)

(56) References Cited

U.S. PATENT DOCUMENTS

| | | |
|---|---|---|
| 2018/0069296 A1 | 3/2018 | Rofougaran et al. |
| 2019/0007121 A1 | 1/2019 | Zhinong et al. |

(Continued)

FOREIGN PATENT DOCUMENTS

| | | |
|---|---|---|
| CN | 107896121 A | 4/2018 |
| CN | 108701907 A | 10/2018 |

(Continued)

OTHER PUBLICATIONS

Supplementary European Search Report in the European Application No. 19925992.0, mailed on Apr. 7, 2022, (11p).
(Continued)

*Primary Examiner* — Shawkat M Ali
(74) *Attorney, Agent, or Firm* — Arch & Lake LLP

(57) ABSTRACT

The present disclosure relates to an antenna panel application method, an apparatus and a non-temporary computer-readable storage medium. The antenna panel application method comprises: activating a first antenna panel set and a second antenna panel set; the first antenna panel set including one or more first antenna panels, said first antenna panels being used for uplink transmission; the second antenna panel set including one or more second antenna panels, said second antenna panels being used for downlink reception.

17 Claims, 9 Drawing Sheets

(51) Int. Cl.
*H04B 7/06* (2006.01)
*H04W 72/23* (2023.01)

(52) U.S. Cl.
CPC ......... *H04B 7/0623* (2013.01); *H04B 7/0626* (2013.01); *H04B 7/0691* (2013.01); *H04W 72/23* (2023.01)

(58) Field of Classification Search
CPC .. H04B 7/0626; H04B 7/0691; H04B 7/0802; H04B 17/10; H04L 5/00; H04W 8/24; H04W 52/02; H04W 72/04; H04W 72/08; H04W 72/23; H04W 76/38
USPC .......................... 375/219, 260, 267, 295, 316
See application file for complete search history.

(56) References Cited

U.S. PATENT DOCUMENTS

| | | | |
|---|---|---|---|
| 2019/0049577 | A1 | 2/2019 | Iida et al. |
| 2019/0132851 | A1 | 5/2019 | Davydov et al. |
| 2020/0267536 | A1* | 8/2020 | Zhou ................ H04B 7/0404 |
| 2020/0344686 | A1* | 10/2020 | Venugopal ........ H04W 52/0235 |
| 2021/0168714 | A1* | 6/2021 | Guan ................ H04B 7/0404 |
| 2021/0336737 | A1 | 10/2021 | Li |

FOREIGN PATENT DOCUMENTS

| | | |
|---|---|---|
| CN | 108702188 A | 10/2018 |
| CN | 109246743 A | 1/2019 |
| CN | 109327250 A | 2/2019 |
| CN | 109417717 A | 3/2019 |
| CN | 109495879 A | 3/2019 |
| RU | 2613178 C2 | 3/2017 |
| WO | 2014196962 A1 | 12/2014 |
| WO | 2017192889 A1 | 11/2017 |
| WO | 2018128363 A1 | 7/2018 |

OTHER PUBLICATIONS

Office Action of the Indian Application No. 202147052801, issued on May 4, 2022 with partial English translation, (5p).
VIVO, "Discussion on Multi-Beam Operation" 3GPP Draft; R1-1900138_DIscussion on Multi-Beam Operation, 3rd Generati N Partnership Project (3GPP), Mobile Competence Centre ; 650, Route Des Lucioles; F-06921 Sophia-Antipolis Cedex; France vol. RAN WGI1, No, Taipei; Jan. 21, 2019-Jan. 25, 2019 Jan. 2019, (10p).
International Search Report of PCT Application No. PCT/CN2019/084669 dated Jul. 29, 2019 with English translation, (4p).
English translation of the Written Opinion of the International Search Authority in the international application No. PCT/CN2019/084669, mailed on Jul. 29, 2019, (4p).
First Office Action of the Chinese Application No. 201980000767.5, issued on May 18, 2021, with English translation, (18p).
First Office Action of the Russian Application No. 2021134008, issued on Jun. 16, 2022, (25p).
ZTE, "Enhancements on multi-beam operation", 3GPP TSG RAN WG1 #96b R1-1904014, Internet<URL: https://www.3gpp.org/ftp/tsg_ran/WG1_RL1/TSGR1_96b/Docs/R1-1904014.zip>, Apr. 12, 2019, (17p).
Asia Pacific Telecom, "Enhancements on UL Multi-beam Operation", 3GPP TSG RAN WG1 #96 R1-1902408, Internet<URL: http://www.3gpp.org/ftp/tsg_ran/WG1_RL1/TSGR1_96/Docs/R1-1902408.zip>, Mar. 1, 2019, (4p).
Sony, "Considerations on multi-beam operation", 3GPP TSG RAN WG1 adhoc NR AH 1901 R1-1900378, Internet<URL: http://www.3gpp.org/ftp/tsg_ran/WG1_RL1/TSGR1_AH/NR_AH_1901/Docs/R1-1900378.zip>, Jan. 25, 2019, (8p).
Xiaomi, "Enhancements on beam management", 3GPP TSG RAN WG1 adhoc_NR_AH_1901 R1-1900842, Internet<URL: http://www.3gpp.org/ftp/tsg_ran/WG1_RL1/TSGR1_AH/NR_AH_1901/Docs/R1-1900842.zip>, Jan. 25, 2019, (4p).
First Office Action of the Japanese Application No. 2021-563276, issued on Oct. 3, 2022, (7p).
CATT, "CSI feedback for NR MIMO", 3GPP TSG RAN WG1 Meeting #86bis R1-1608777 Lisbon, Portugal, Oct. 10-14, 2016, the whole document. 5 pages.

* cited by examiner

S110

A first antenna panel set and a second antenna panel set are activated

FIG. 2

ANTENNA PANEL APPLICATION METHOD, APPARATUS AND STORAGE MEDIUM

CROSS-REFERENCE TO RELATED APPLICATION

This application is the U.S. national phase of PCT Patent Application No. PCT/CN2019/084669 filed on Apr. 26, 2019, the entire content of which is incorporated herein by reference for all purposes.

TECHNICAL FIELD

The disclosure relates, but is not limited, to the technical field of wireless communications, and more particularly to an antenna panel application method and apparatus, and a storage medium.

BACKGROUND

In a New Radio (NR) system, especially in a communication frequency range 2 (above 6 Ghz), channel fading will accelerate due to the high frequency of communication frequency band range 2. To ensure coverage, beams are usually used for transmission and reception. In the related art, a base station uses an antenna panel to send information to a terminal, and the terminal uses an antenna panel to receive the information sent by the base station, which will lead to a problem of insufficient space diversity in an information transmission process.

SUMMARY

The disclosure provides an antenna panel application method and apparatus, and a storage medium.

According to a first aspect of the present disclosure, an antenna panel application method is provided, which includes activating a first antenna panel set and a second antenna panel set. The first antenna panel set includes one or more first antenna panels used for uplink transmission. The second antenna panel set includes one or more second antenna panels used for downlink reception.

According to a second aspect of the present disclosure, an antenna panel application method is provided, and the method includes sending activation signaling. The activation signaling indicates an antenna panel set to be activated, and the antenna panel set to be activated includes a first antenna panel set and a second antenna panel set, the first antenna panel set including one or more first antenna panels used for uplink transmission, and the second antenna panel set including one or more second antenna panels used for downlink reception.

According to a third aspect of the present disclosure, an antenna panel application apparatus is provided. The apparatus includes: a processor, a memory and an executable program stored in the memory and capable of being run by the processor. When running the executable program, the processor performs: activating a first antenna panel set and a second antenna panel set. The first antenna panel set includes one or more first antenna panels used for uplink transmission, and the second antenna panel set includes one or more second antenna panels used for downlink reception.

It is to be understood that the above general descriptions and detailed descriptions below are only exemplary and explanatory and not intended to limit the disclosure.

BRIEF DESCRIPTION OF THE DRAWINGS

The accompanying drawings, which are incorporated in and constitute a part of this specification, illustrate examples consistent with the disclosure and, together with the description, serve to explain the principles of the disclosure.

FIG. 2 is a flowchart of an antenna panel application method according to one or more examples of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Network architecture and service scenarios described in the examples of the disclosure are intended to more clearly describe the examples of the disclosure, and do not form a limit to the examples of the disclosure. Those of ordinary skill in the art know that with the evolution of network architecture and the emergence of new service scenarios, the examples of the disclosure are also applicable to similar technical problems.

Figure 1:
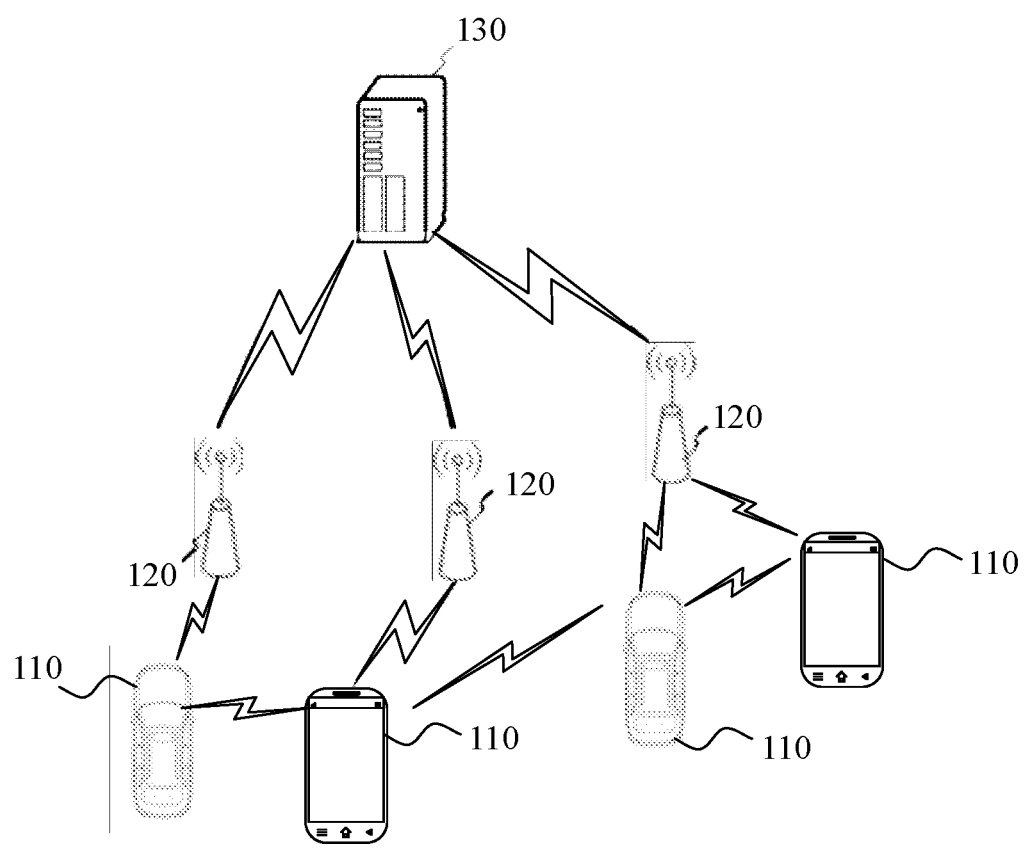
FIG. 1 is a structure diagram of a wireless communication system according to one or more examples of the present disclosure.

FIG. 1 is a structure diagram of a wireless communication system provided by an example of the disclosure. As shown in FIG. 1, the wireless communication system is a communication system based on a cellular mobile communication technology, and may include: a plurality of terminals 110 and a plurality of base stations 120.

The terminal 110 may be a device that provides voice and/or data connectivity for a user. The terminal 110 may communicate with one or more core networks through a Radio Access Network (RAN). The terminal 110 may be an Internet of Things (IoT) terminal, for example, a sensor device, a mobile phone (or called a "cell" phone) and a computer with an IoV terminal, and for example, may be a fixed, portable, pocket-sized, handheld, computer-embedded or vehicle-mounted device, for example, a Station (STA), a subscriber unit, a subscriber station, a mobile station, a mobile, a remote station, an access point, a remote terminal, an access terminal, a user terminal, a user agent, a user device or User Equipment (UE). Or, the terminal 110 may be an Unmanned Aerial Vehicle (UAV). Or, the terminal 110 may also be a vehicle-mounted device, and for example, it may be a driving computer with a wireless communication function or a wireless communication device connected to a driving computer. Or, the terminal 110 may also be a roadside device, for example, it may be a street lamp, a signal lamp or other roadside devices with a wireless communication function.

The base station 120 may be a network-side device in a wireless communication system. The wireless communication system may be a $4^{th}$ Generation mobile communication (4G) system, also called a Long Term Evolution (LTE) system. Or, the wireless communication system may also be a $5^{th}$-Generation (5G) system, also called a New Radio (NR) system or a 5GNR system. Or, the wireless communication system may also be a next-generation system of the 5G system. An access network in the 5G system may be called a New Generation-Radio Access Network (NG-RAN).

The base station 120 may be an Evolved Node B (eNB) in the 4G system. Or, the base station 120 may also be a gNB adopting a central distributed architecture in the 5G system. The base station 120, when adopting the central distributed architecture, usually includes a Central Unit (CU) and at least two Distributed Units (DUs). Protocol stacks of a Packet Data Convergence Protocol (PDCP) layer, a Radio Link Control (RLC) layer and a Media Access Control (MAC) layer are arranged in the CU. A protocol stack of a Physical (PHY) layer is arranged in the DU. A specific implementation manner of the base station 120 is not limited in the example of the disclosure.

The base station 120 may establish a wireless connection with the terminal 110 through a radio interface. In different implementations, the radio interface is a 4G-standard-based radio interface; or, the radio interface is a 5G-standard-based radio interface, for example, the radio interface is an NR interface; or, the radio interface may also be a radio interface based on a next-generation mobile communication network technology standard of 5G.

In some examples, an End to End (E2E) connection may also be established between the terminals 110, for example, scenarios such as Vehicle to Vehicle (V2V) communication, Vehicle to Infrastructure (V2I) communication, and Vehicle to Pedestrian (V2P) communication in Vehicle to Everything (V2X) communication.

In some examples, the wireless communication system may also include a network management device 130.

A plurality of base stations 120 are connected to the network management device 130 respectively. The network management device 130 may be a core network device in the wireless communication system. For example, the network management device 130 may be a Mobility Management Entity (MME) in an Evolved Packet Core (EPC). Or, the network management device may also be another core network device, for example, a Serving GateWay (SGW), a Public Data Network GateWay (PGW), a Policy and Charging Rules Function (PCRF) or a Home Subscriber Server (HSS). An implementation form of the network management device 130 is not limited in the example of the disclosure.

In the 5G NR system, especially when a communication frequency band is in frequency range 2 (above 6 GHz), due to the fast attenuation of high frequency channels, in order to ensure coverage, beam-based transmission and reception is required between a terminal and a base station. To ensure coverage, a beam is usually used for sending and receiving.

In the related art, a base station uses an antenna panel to send information to a terminal, and the terminal uses an antenna panel to receive the information sent by the base station, which will lead to a problem of insufficient space diversity in an information transmission process.

As shown in FIG. 2, an example provides an antenna panel application method, which includes the following step.

At S110, a first antenna panel set and a second antenna panel set are activated.

The first antenna panel set includes one or more first antenna panels used for uplink transmission.

The second antenna panel set includes one or more second antenna panels used for downlink reception.

The antenna panel application method provided by the example is applied to a terminal. The terminal may be a variety of communication terminals, such as a mobile terminal such as a mobile phone, a tablet or a wearable device, and a vehicle-mounted terminal. The terminal may also be the IoV terminal corresponding to a variety of intelligent devices.

In the example, the terminal is equipped with more than one antenna panel, for example, the terminal includes two or more than two antenna panels. The orientation of different antenna panels may be different, so that the beams in different transmission directions may be received and sent, thereby realizing multi-space diversity.

In the example, when activating the antenna panel, the terminal activates the first antenna panel set and the second antenna panel set respectively. Each of the first antenna panel set and the second antenna panel set includes one or more antenna panels.

In the example, the antenna panel included in the first antenna panel set is called a first antenna panel, and the "first" here does not have a special meaning; the antenna panel included in the second antenna panel set is called a second antenna panel, and the "second" here does not have a special meaning, but is only used for distinguishing the antenna panels in the first antenna panel set and the second antenna panel set.

In the example, after being activated, the antenna panels included in the first antenna panel set and the second antenna panel set are in a ready state. The antenna panel in the ready state may be used for sending and receiving information. If the antenna panel is not activated, the corresponding antenna panel is in a closed or dormant state, and cannot be used for sending and receiving information.

One or more first antenna panels included in the first antenna panel set are used for uplink transmission, and one or more second antenna panels included in the second antenna panel set are used for downlink reception, so this is equivalent to dividing receiving and sending functions of the activated antenna panel. In this case, when activating the antenna panel, the terminal knows which antenna panels will be used for uplink transmission and which antenna panels will be used for downlink reception, instead of randomly selecting the antenna panel for uplink transmission and downlink reception when data needs to be sent and received, as in the related art. If the antenna panel for uplink transmission and downlink reception is selected randomly, on one hand, all the antenna panels are occupied in a first transmission direction, and there is no antenna panel available in a second transmission direction, resulting in a large delay of wireless signals in the second transmission direction; if the first transmission direction is uplink, the second transmission direction is downlink; if the first transmission direction is downlink, the second transmission direction is uplink.

On the other hand, if the first transmission direction occupies multiple antenna panels, the second transmission direction occupies a few antenna panels, resulting in less space diversity of the second transmission direction, and thus affecting the signal quality of the second transmission direction.

On the other hand, some antenna panels have a large transmission load, while some antenna panels are idle, for the idle antenna panels, the effective utilization rate of resources is low, and for all the antenna panels of the terminal, the load is unbalanced.

In the example, the first antenna panel set and the second antenna panel set are divided when the antenna panels are activated, and whether the antenna panels included in the two antenna panel sets are used for uplink transmission or downlink reception is configured in advance, so the phenomena of large transmission delay in a certain transmission direction, poor transmission quality in a certain transmission direction, or unbalanced load of the antenna panel may be reduced.

The uplink transmission in the examples of the disclosure includes that the terminal sends any signal, signaling and data to the base station.

The downlink reception includes that the terminal receives any signal, signaling and data sent by the base station.

In some examples, the first antenna panel included in the first antenna panel set is completely different from the second antenna panel included in the second antenna panel set. That is, the first antenna panel is completely different from the second antenna panel.

In some other examples, the first antenna panel set and the second antenna panel set include at least one identical antenna panel which supports both uplink transmission and downlink reception.

If the terminal has the antenna panel that supports both uplink transmission and downlink reception, the antenna panel may be included in both the first antenna panel set and the second antenna panel set.

Because multiple first antenna panels included in the first antenna panel set and multiple second antenna panels included in the second antenna panel set will not work at the same time, then, at one moment, some selected first antenna panels work (that is, for uplink transmission), and some unselected first antenna panels do not work (that is, not for uplink transmission). In this case, if the first antenna panel which is not selected for uplink transmission is an antenna panel with both uplink transmission capability and downlink reception capability, and the antenna panel is included in the second antenna panel set, then the antenna panel may be selected as the second antenna panel for downlink reception. In this case, the effective utilization rate of the antenna panel is improved.

Figure 3:
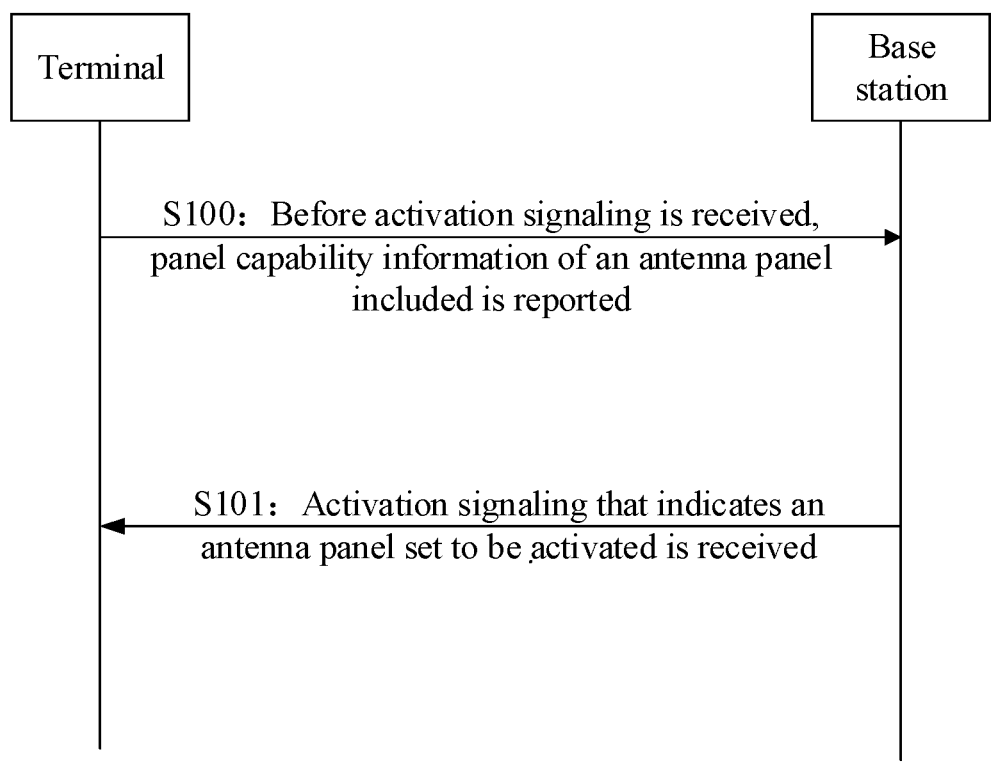
FIG. 3 is a flowchart of another antenna panel application method according to one or more examples of the present disclosure.

In some examples, as shown in FIG. 3, the method may further include the following step.

At S101, activation signaling that indicates an antenna panel set to be activated is received.

The base station will send activation signaling to the terminal. The activation signaling includes, but is not limited to, Medium Access Control (MAC) layer signaling.

The activation signaling informs the terminal that the antenna panel needs to be activated on one hand, and may indicate the antenna panel set that the terminal needs to activate on the other hand. The antenna panels included in the antenna panel set that the terminal needs to activate may be the same as, partially the same as or completely different from those included in the first antenna panel set and the second antenna panel set described above.

For example, the activation signaling carries an antenna panel identifier of the antenna panel included in the antenna panel set that the terminal needs to activate.

The antenna panel identifier here may indicate the corresponding antenna panel in the terminal. The antenna panel identifier may include, but is not limited to, an antenna panel number.

In some examples, the activation signaling indicates the first antenna panel set and the second antenna panel set that the terminal needs to activate. S110 may include that: the first antenna panel set and the second antenna panel set are activated according to the activation signaling.

In this case, the antenna panel sets indicated by the activation signaling are the first antenna panel set and the second antenna panel set finally activated by the terminal. In the example, because the first antenna panel set and the second antenna panel set activated by the terminal are the antenna panel set indicated by the activation signaling, the terminal does not need to report activation information of the antenna panels it has activated.

In some examples, the terminal may send an acknowledgment instruction to the base station when activating the first antenna panel set and the second antenna panel set in full accordance with the activation signaling. In this way, the base station knows that the terminal activates the first antenna panel set and the second antenna panel set in full accordance with the activation signaling sent by the base station.

In some other examples, the first antenna panel set and the second antenna panel set are subsets of the antenna panel set indicated by the activation signaling, in this case, the activation signaling includes the first antenna panel set and the second antenna panel set to be activated by the terminal. Correspondingly, S110 may include that: the first antenna panel set and the second antenna panel set indicated in the activation signaling are activated.

Because the first antenna panel set and the second antenna panel set finally activated by the terminal are subsets of the antenna panel set that is activated by the terminal under the instruction of the activation signaling, by reporting the activation information of the antenna panel, the terminal informs the base station of the first antenna panel set and the second antenna panel set finally activated by the terminal itself.

In some other examples, the activation signaling indicates a part of the antenna panels in the first antenna panel set and the second antenna panel set that the terminal need to activate. In this case, the activation signaling sent by the base station only indicates a part of the antenna panels in the first antenna panel set and the second antenna panel set that the terminal needs to activate, and the other part of the antenna panels in the first antenna panel set and the second antenna panel set may be flexibly set by the terminal itself. For example, the terminal may flexibly select another part of the antenna panels that form the first antenna panel set and the second antenna panel set according to its own transmission demand and a transmission state of the antenna panel. Therefore, S110 may include that: a part of the antenna panels in the first antenna panel set and the second antenna panel set which are indicated by the activation signaling are activated, and the other part of the antenna panels in the first antenna panel set and the second antenna panel set are automatically activated according to panel capability information.

Similarly, in this case, because the terminal does not activate the first antenna panel set and the second antenna panel set in full accordance with the activation signaling, the method may further include that: the terminal reports panel activation information of the first antenna panel set and the second antenna panel set to the base station.

In the examples of the disclosure, through the reported panel activation information, the base station may know which antenna panels are activated by the terminal, and know the division of the first antenna panel set and the second antenna panel set. Subsequently, the base station may schedule the first antenna panel set and the second antenna panel set for targeted uplink and downlink transmission to ensure transmission quality.

As shown in FIG. 3, the method may further include the following step.

At S100, before the activation signaling is received, panel capability information of an antenna panel included is reported. The panel capability information indicates at least one of the following:

the number of antenna panels included;

when at least two antenna panels are included, whether the at least two antenna panels can be activated at the same time; or when at least two antenna panels can be activated at the same time, whether to support the at least two activated antenna panels for simultaneous uplink transmission.

In the example, before the base station sends the activation signaling, the terminal also reports the panel capability information of the antenna panel it includes. After the panel capability information is reported to the base station, the base station generates the activation signaling according to the panel capability information.

Here, the activation signaling may be an instruction for the base station to indicate the antenna panel that the terminal needs to activate, or signaling for the base station to indicate the antenna panel sets respectively for uplink transmission and/or downlink reception that the terminal needs to activate. The panel capability information includes the number of antenna panels. The more antenna panels a terminal includes, the stronger the transmission capability of the terminal is to a certain extent.

Some terminals support the simultaneous activation of two or more than two antenna panels, and some terminals may support the activation of only one antenna panel. This information is also informed to the base station through the panel capability information.

The terminal has different uplink transmission power, or a radio frequency device can determine whether the terminal supports multiple antenna panels to perform uplink transmission simultaneously. Some terminals do not support two or more than two antenna panels to perform uplink transmission simultaneously. Similarly, it is also needed to inform this panel capability information to the base station, so as to be convenient for the base station to decide and optimize the construction of the first antenna panel set and the second antenna panel set.

In the example, the activation signaling may be generated by the base station according to the antenna panel information.

In some examples, the method may further include the following operations.

The terminal automatically activates the first antenna panel set and the second antenna panel set according to the panel capability information.

The panel activation information of the first antenna panel set and the second antenna panel set is sent to the base station.

In the example, the terminal itself has the capability of determining to activate the first antenna panel set and the second antenna panel set. The terminal may have data transmission requirements before receiving the activation signaling, and automatically activate the first antenna panel set and the second antenna panel set in combination with the panel capability information.

Of course, the time when the terminal automatically activates the first antenna panel set and the second antenna panel set according to the panel capability information may also be any time, and is not limited to the time before receiving the activation signaling.

The panel capability information here may refer to the corresponding description of the above example, and will not be repeated here.

Because the terminal completes the activation of the first antenna panel set and the second antenna panel set by itself, in order to inform the base station of the antenna panel currently activated by itself and the division between the first antenna panel set and the second antenna panel set, the terminal will send the panel activation information to the base station.

In some examples, the panel activation information may include, but is not limited to: an antenna panel identifier of the first antenna panel and an antenna panel identifier of the second antenna panel.

In some other examples, the panel activation information may include, but is not limited to: an antenna panel identifier of the activated antenna panel and division information of the first antenna panel set and the second antenna panel set.

To sum up, there are many kinds of identifiers of the panel activation information, and the base station can determine, according to the panel activation information, the first antenna panel set and the second antenna panel set activated by the terminal.

In some examples, if the base station receives the panel activation information reported by the terminal before sending the activation signaling, the sending of the activation signaling may be ignored.

In some examples, the method may further include the following operation.

The activation signaling sent by the base station is received. The activation signaling may be an instruction for the base station to indicate the antenna panel that the terminal needs to activate, or any signaling for the base station to indicate the antenna panel sets respectively for uplink transmission and/or downlink reception that the terminal needs to activate.

In the example, the activation signaling indicates a third antenna panel set and a fourth antenna panel set to be activated. The method may further include the following operations.

After receiving the activation signaling, the terminal ignores the activation signaling, and automatically activates the first antenna panel set and the second antenna panel set according to panel capability information.

The panel activation information of the first antenna panel set and the second antenna panel set is reported to the base station.

In the example, the antenna panels included in the third antenna panel set are partially the same as or completely different from the antenna panels included in the first antenna panel set and the second antenna panel set, respectively.

The antenna panels included in the fourth antenna panel set are partially the same as or completely different from the antenna panels included in the first antenna panel set and the second antenna panel set, respectively.

In the example, after receiving the activation signaling, the terminal may not activate the first antenna panel set and the second antenna panel set according to the activation signaling sent by the base station, considering its own transmission requirement and the current state of the antenna panel. In this case, the terminal ignores the activation signaling sent by the base station. In this case, the antenna panels included in the first antenna panel set and the second antenna panel set automatically activated by the terminal are not the antenna panels to be activated indicated in the activation signaling sent by the base station.

That the terminal shields the activation signaling sent by the base station here includes, but is not limited to, at least one of the following:

discarding the activation signaling, the discarded activation signaling being no longer executed; or preventing the activation signaling from being added to a queue of instructions to be executed.

In a word, there are several ways to ignore the activation signaling, which are not limited to the examples above.

In the example, the terminal ignores the activation signaling and does not execute the activation signaling at all, but activates, according to the panel capability information it knows, panels other than the panel indicated through the activation signaling in the first antenna panel set and second antenna panel set. In order to facilitate the base station to know the panel set automatically activated by the terminal, the current panel activation information will be reported to the base station.

In some examples, the method may further include the following operations.

PDCCH signaling is received.

A first antenna panel identifier of the first antenna panel for uplink transmission is determined according to the PDCCH signaling.

The PDCCH signaling is DCI signaling transmitted using a PDCCH.

The PDCCH signaling has a characteristic of high transmission rate. The antenna panel will be activated and ready to transmit. The specific antenna panel used for uplink transmission and downlink reception may be indicated by the base station according to the current network environment, activation and transmission configuration of the antenna panel of other terminals, and etc.

In the example, the PDCCH signaling carries a first antenna panel identifier, and the first antenna panel corresponding to the first antenna panel identifier is the antenna panel selected for uplink transmission. For example, the first antenna panel set includes: antenna panel A, antenna panel B and antenna panel C; if the PDCCH signaling carries an antenna panel identifier of the antenna panel B, the antenna panel B is selected for uplink transmission.

In some examples, if the first antenna panel set includes only one first antenna panel, the first antenna panel is configured for uplink transmission by default, and the PDCCH signaling is not required to specifically indicate the first antenna panel specifically used for uplink transmission.

In some examples, the method may further include the following operations.

Physical Downlink Control Channel (PDCCH) signaling is received. The PDCCH signaling includes indication information, the indication information indicating first antenna panel identifiers of multiple first antenna panels for uplink transmission.

One of the first antenna panels for uplink transmission is determined according to a main antenna panel identifier indicated by physical layer signaling and/or high-level signaling. The physical layer signaling includes DCI signaling. The high-level signaling includes MAC layer signaling and/or Radio RRC signaling.

In some examples, the PDCCH signaling carries a plurality of first antenna panel identifiers through the indication information.

In some other examples, the terminal may receive multiple PDCCH signalings, and each PDCCH signaling may carry one first antenna panel identifier. If the terminal does not support multiple first antenna panels for uplink transmission at the same time, the terminal will select one first antenna panel for uplink transmission according to the main antenna panel identifier indicated through signaling sent by the base station.

Of course, in some other examples, if multiple first antenna panel identifiers indicated through multiple PDCCH signalings do not include the main antenna panel identifier, the first antenna panel identified by one first antenna panel identifier may be randomly selected for uplink transmission.

For example, if multiple first antenna panel identifiers indicated through multiple PDCCH signalings include the main antenna panel identifier, the first antenna panel identified by the main antenna panel identifier is randomly selected for uplink transmission.

The signaling sent by base station here may be various forms of signaling, for example, physical layer signaling. The physical layer signaling includes, but is not limited to, the DCI signaling. The signaling sent by base station also includes: high-level signaling. The high-level signaling includes, but is not limited to, the MAC layer signaling and/or the RRC signaling.

In some examples, the multiple PDCCH signalings will also indicate a time-frequency resource for uplink transmission, for example, indicate resource parameters such as time slot, frequency band and carrier used by the first antenna panel for uplink transmission.

In some examples, the second antenna panel set has multiple downlink reception configuration combinations.

The downlink reception configuration combination includes that:

the second antenna panel set has multiple downlink reception configuration combinations.

The downlink reception configuration combination includes that:

a part of the second antenna panels are used for receiving at least one of downlink reference signal, downlink control channel signaling or downlink data, and the rest of the second antenna panels do not perform downlink reception;

or, a part of the second antenna panels are used for receiving at least one of the downlink reference signal, the downlink control channel signaling or the downlink data, and the rest of the second antenna panels are used for receiving the downlink reference signal;

or, all of the second antenna panels are used for receiving at least one of the downlink reference signal, the downlink control channel signaling or the downlink data.

The downlink reference signal includes, but is not limited to, at least one of the following:

Synchronization Signal Block (SSB);
Non Zero Power (NZP) Channel State Information-Reference Signal (CSI-RS);
Discovery Reference Signal (DRS); or
Demodulation Reference Signal (DMRS).

By receiving the downlink reference signal, the synchronization between the terminal and the base station is realized, or channel state information measurement, beam measurement, RRM measurement and etc. are realized.

After activating the antenna panel, the terminal may use the activated antenna panel to perform information interaction with the base station.

In the example, the downlink control channel signaling includes the physical layer signaling and/or the high-level signaling above the physical layer. The physical layer signaling includes, but is not limited to, the PDCCH signaling. The high-level signaling includes, but is not limited to, the MAC layer signaling and/or the RRC signaling.

The downlink data may include downlink data transmitted using a PDSCH.

In the example, downlink reception configuration of the second antenna panel in the second antenna panel set may be indicated by the base station or reported to the base station at the discretion of the terminal.

Specifically, the method may further include at least one of the following operations.

The PDCCH signaling is received using at least one of the second antenna panels, and uplink data is sent on the PUSCH using one of the first antenna panels.

The cell reference signal of the serving cell is received using at least one of the second antenna panels, and the beam measurement report and/or the channel state information measurement report is sent using one of the first antenna panels.

The downlink reference signal of the serving cell and/or neighboring cell is received using at least one of the second antenna panels, and the RRM measurement report is sent using one of the first antenna panels.

The PDCCH signaling is received and/or the PDSCH data is received using at least one of the second antenna panels, and a random access preamble is sent using one of the first antenna panels to a target cell that the terminal accesses.

The PDSCH data is received using at least one of the second antenna panels, and an HARQ feedback for downlink reception data is sent using one of the first antenna panels.

The downlink reference signal is received using at least one of the second antenna panels, and beam failure information is reported using one of the first antenna panels.

In some examples, the uplink transmission of the first antenna panel and the downlink reception of the second antenna panel may be performed synchronously. In some other examples, the uplink transmission of the first antenna panel and the downlink reception of the second antenna panel may be performed asynchronously. Performing asynchronously here means that uplink transmission time and downlink reception time are staggered. For performing synchronously, the uplink transmission time is the same as the downlink reception time.

In the example, the PDCCH signaling is received by the second antenna panel, and the uplink data is transmitted by the first antenna panel. The uplink data includes user data of various service types.

By receiving the cell reference signal, the received cell reference signal may be measured, and various measurement results representing receiving strength are obtained. For example, Reference Signal Receiving Power (RSRP), Signal to Interference plus Noise Ratio (SINR) and Reference Signal Receiving Quality (RSRQ) are acquired by measuring the cell reference signal. Specifically, for example, the RSRP includes, but is not limited to, L1 (layer 1, namely the physical layer)-RSRP, and the SINR includes, but is not limited to, L1-SINR.

A serving cell may be the cell where the terminal currently resides, and a neighboring cell is a cell adjacent to the serving cell. The RRM measurement of the serving cell and the neighboring cell may be realized by receiving the downlink reference signals of the serving cell and the neighboring cell at the same time, so that the terminal may select, according to the measurement result of the serving cell and/or the neighboring cell, a resident cell or the target cell for access.

In some examples, the random access preamble is used for random access of the terminal.

In some examples, if a suitable target cell for access is found by measuring the cell reference signal of the neighboring cell, random access may be initiated to the target cell while keeping receiving the data of the serving cell based on the second antenna panel to achieve seamless switch. During random access of the target cell, one or more first antenna panels may be selected to request access at a predetermined transmission power of the terminal (for example, the maximum transmission power), thereby increasing the success rate of random access.

In some examples, one or more second antenna panels receive the PDCCH signaling and PDSCH data sent by the serving cell (the downlink data transmitted through the PDSCH), at the same time, at least one first antenna panel is used for sending the random access preamble to the target cell to request the random access. In this way, a connection with the target cell may be performed while remaining a connection with the serving cell, and a disconnection from the serving cell is performed after completing the connection with the target cell, thereby realizing the seamless switch of the terminal between the current serving cell and the target cell, reducing transmission interruption caused by cell switch, that is, after disconnecting from the current serving cell, connecting to the target serving cell, and improving transmission continuity.

In some examples, the HARQ feedback may include: Acknowledgement (ACK) and/or Non-Acknowledgement (NACK).

If at least one second antenna panel receives the PDSCH data, and at least one first antenna panel performs the HARQ feedback at the same time, the terminal may perform the HARQ feedback for the data received on multiple antenna panels on one antenna panel, which can reduce an HARQ feedback delay.

In some examples, the HARQ feedback of the downlink data received on multiple second antenna panels may be fed back to the base station using one of the first antenna panels. For example, one of the first antenna panels sends the HARQ feedback of multiple second antenna panels on a Physical Uplink Control Channel (PUCCH), thereby saving transmission resources of the PUCCH and reducing the HARQ feedback delay.

In some examples, multiple second antenna panels may receive downlink reference signals of the serving cell and perform CSI measurements, and one of the first antenna panels feeds back CSI values of the CSI measurements of multiple second antenna panels on a PUCCH, thereby saving the transmission resources of the PUCCH and reducing a CSI feedback delay.

In some examples, at least one second antenna panel receives the downlink reference signal, the terminal detects a beam failure on one or more serving cells based on reference signals on multiple second antenna panels, the serving cell may be a Primary cell (Pcell) or a Secondary Cell (Scell), and then beam failure information is reported on one first antenna panel. After that, the base station may perform beam failure recovery or perform beam measurement again for the cell with beam failure after receiving the beam failure information, so as to select a better beam for uplink and downlink transmission to ensure the success rate of transmission and/or reduce retransmission.

It is to be noted that, in the examples of the disclosure, the division of the antenna panel set may also include at least one of the following:
- the third antenna panel in the fifth antenna panel set can only be used for downlink reception;
- the fourth antenna panel in the sixth antenna panel set can only be used for uplink transmission; or
- the fifth antenna panel in the seventh antenna panel set can be used for both downlink reception and uplink transmission.

The terminal activates the fifth antenna panel set, the sixth antenna panel set, and the seventh antenna panel set. The fifth antenna panel set, the sixth antenna panel set, and the seventh antenna panel set do not include the same antenna panel.

Figure 4:
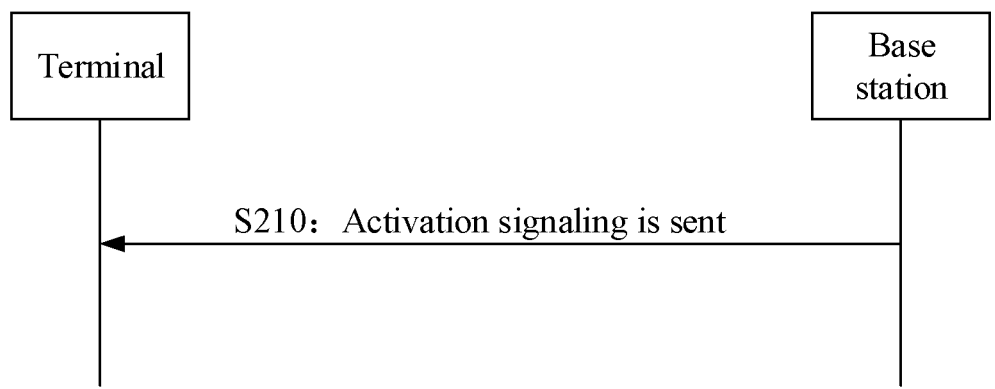
FIG. 4 is a flowchart of still another antenna panel application method according to one or more examples of the present disclosure.

As illustrated in FIG. 4, an example provides an antenna panel application method, which may include the following step.

At S210, activation signaling is sent. The activation signaling indicates an antenna panel set to be activated. The activated antenna panel set include: the first antenna panel set and the second antenna panel set. The first antenna panel set includes one or more first antenna panels used for uplink transmission, and the second antenna panel set includes one or more second antenna panels used for downlink reception.

The antenna panel application method provided in the example may be applied to the base station. The base station may include, but is not limited to: a macro base station, a micro base station, a 4G base station, a 5G base station, a vehicle-mounted device, etc.

When both the base station and the terminal are vehicle-mounted devices, the reference signal, control signaling and data all use channels of Sidelink.

The base station sends the activation signaling to the terminal, on the one hand, the activation signaling may trigger the terminal to activate the antenna panel, on the other hand, the activation signaling may indicate the antenna panel set that the terminal needs to activate, and the terminal activates, according to the activation signaling, the first antenna panel set and the second antenna panel set respectively used for uplink transmission and downlink reception. In this way, compared with that the terminal randomly selects the antenna panel for uplink and downlink transmission, one or more of the technical effects like improving transmission quality, realizing load balancing of antenna panel, and reducing the transmission delay may be achieved.

In some examples, the first antenna panel set and the second antenna panel set include at least one identical antenna panel which supports uplink transmission and downlink reception. If the first antenna panel set and the second antenna panel set have the same antenna panel, the idle antenna panel may be reduced to further improve the effective utilization rate of the antenna panel.

Figure 5:
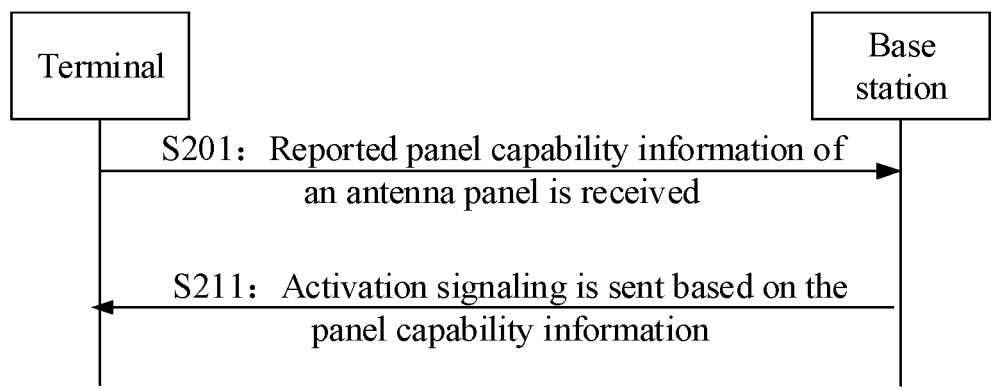
FIG. 5 is a flowchart of yet another antenna panel application method according to one or more examples of the present disclosure.

In some examples, as shown in FIG. 5, the method may further include the following step.

At S201, reported panel capability information of an antenna panel is received.

S210 may include S211. S211 may include that the activation signaling is sent based on the panel capability information.

In the example, in order to optimize the configuration of the first antenna panel set and the second antenna panel set, the panel capability information of the antenna panel will be received from the terminal.

The capability information of the antenna panel includes at least one of the following:
- the number of antenna panels included in the terminal;
- when the terminal includes at least two antenna panels, whether the at least two antenna panels can be activated at the same time; or
- when the terminal can activate at least two antenna panels at the same time, whether to support the at least two activated antenna panels for simultaneous uplink transmission.

Detailed description of the panel capability information here may be found in the corresponding position of the example, which will not be repeated here.

In some examples, if the terminal activates the antenna panel according to the activation signaling sent by the base station, the base station may receive an activation acknowledgment instruction, and then the base station may perform uplink and downlink transmission of the configuration of the first antenna panel set and the second antenna panel set according to the activation signaling.

In some examples, the method may further include the following operation.

The panel activation information of the antenna panel activated by the terminal is received.

If the terminal does not activate the antenna panel according to the activation signaling or does not fully activate the antenna panel according to the activation signaling, the terminal will automatically report the panel activation information, so that the base station may perform uplink and downlink transmission with the terminal according to the panel activation information.

In some examples, there may be three types of activation signaling within a general range.

For the first type, the activation signaling indicates the first antenna panel set and the second antenna panel set that the terminal needs to activate. In this case, the terminal may activate the first antenna panel set and the second antenna panel set in full accordance with the activation signaling.

For the second type, the activation signaling indicates the first antenna panel set and the second antenna panel set that the terminal needs to activate. In this case, the terminal may select a part of antenna panels in the antenna panel set to be activated indicated by the activation signaling, and activate the first antenna panel set and the second antenna panel set. In this case, the first antenna panel set and the second antenna panel set that the terminal activates are subsets of the antenna panel set indicated by the activation signaling.

For the third type, the activation signaling indicates a part of the antenna panels in the first antenna panel set and the second antenna panel set that the terminal needs to activate. In this case, the antenna panel set to be activated indicated in the activation signaling includes a part of the first antenna panel set and the second antenna panel set, may also include any one or more of the third antenna panel set, the fourth antenna panel set, the fifth antenna panel set, and the sixth antenna panel set. However, when receiving the activation signaling, the terminal only selects to activate the part of the first antenna panel set and the second antenna panel set indicated by the activation signaling, and does not activate other parts in the activation signaling. The terminal automatically activates the other part of the first antenna panel set and the second antenna panel set according to its own capability information.

When the activation signaling is of the second type and the third type, the base station will receive the antenna panel activation information reported by the terminal after activating the first antenna panel set and the second antenna panel set.

In some examples, the method may further include the following operation.

The PDCCH signaling is sent. The PDCCH signaling indicates to the terminal a first antenna panel identifier of one of the first antenna panels for uplink transmission.

In this case, the base station directly indicates the first antenna panel for the current uplink transmission to the terminal through the PDCCH signaling. After receiving the first antenna panel identifier, the terminal may select the first antenna panel corresponding to the first antenna panel identifier from the first antenna panel set for uplink transmission.

In some examples, the method may further include the following operations.

The PDCCH signaling is sent. The PDCCH signaling includes indication information, and the indication information indicating first antenna panel identifiers of multiple first antenna panels for uplink transmission.

The physical layer signaling and/or high-level signaling for indicating the main antenna panel identifier is sent. The physical layer signaling includes the DCI signaling, and the high-level signaling includes the MAC layer signaling and/or RRC signaling. The main antenna panel identifier and the first antenna panel identifier are used for the terminal to determine one of the first antenna panels for uplink transmission.

In some examples, the base station sends multiple first antenna panel identifiers through the PDCCH signaling that carries the indication information, and then simultaneously indicates a main antenna panel identifier through at least one of the physical layer signaling or the high-level signaling. If the main antenna panel identifier is included in the PDCCH signaling, the terminal selects the first antenna panel corresponding to the main antenna panel identifier for the current uplink transmission. In some examples, the method may further include the following operations.

The PDCCH signaling is sent to at least one of the second antenna panels of the terminal, and the uplink data sent by one of the first antenna panels of the terminal on the PUSCH is received.

The cell reference signal of the serving cell is sent to at least one of the second antenna panels of the terminal, and the beam measurement report and/or the channel state information measurement report sent by one of the first antenna panels is received.

The downlink reference signal is sent to at least one of the second antenna panels of the terminal, and the RRM measurement report sent by one of the first antenna panels is received.

The PDCCH signaling and/or the PDSCH data is sent to at least one of the second antenna panels of the terminal, and a random access preamble sent to the target cell by one of the first antenna panels is received.

The PDSCH data is sent to at least one of the second antenna panels of the terminal, and the HARQ feedback for the downlink reception data sent by one of the first antenna panels is received.

The downlink reference signal is sent to at least one of the second antenna panels of the terminal, and the beam failure information reported by one of the first antenna panels is received.

Figure 6:
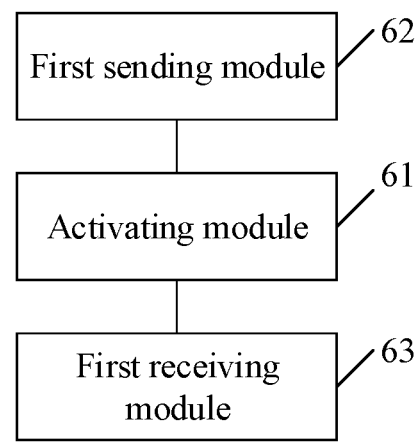
FIG. 6 is a block diagram of an antenna panel application apparatus according to one or more examples of the present disclosure.

As shown in FIG. 6, an example provides an antenna panel application apparatus, which includes an activating module 61.

The activating module 61 is configured to activate a first antenna panel set and a second antenna panel set in the terminal.

The first antenna panel set includes one or more first antenna panels used for uplink transmission.

The second antenna panel set includes one or more second antenna panels used for downlink reception.

In some examples, the activating module 61 may be a program module, and the program module can realize the activation of two antenna panel sets after being executed by a processor. The processor may include a central processing unit, a microprocessor, a digital signal processor, a programmable array, an image processor, an Application-Specific Integrated Circuit (ASIC) and other electronic components with processing functions or a combination of electronic components.

In some other examples, the activating module 61 may be a combination module of software and hardware. The combination module of software and hardware includes, but is not limited to, a programmable array. The programmable array includes, but is not limited to, a complex programmable array or a Field Programmable Gate Array (FPGA).

In some other examples, the activating module 61 may include: a pure hardware module. The pure hardware module includes, but is not limited to, the ASIC.

Based on the above solution, the apparatus may further include:
a first receiving module 63, configured to receive activation signaling that indicates an antenna panel set to be activated.

Based on the above solution, the activation signaling indicates the first antenna panel set and the second antenna panel set to be activated.

The activating module 61 is configured to activate the first antenna panel set and the second antenna panel set indicated in the activation signaling.

Based on the above solution, the activation signaling includes the first antenna panel set and the second antenna panel set to be activated.

The activating module 61 is configured to activate the first antenna panel set and the second antenna panel set indicated in the activation signaling.

The apparatus may further include:
a first sending module 62, configured to report panel activation information of the first antenna panel set and the second antenna panel set.

Based on the above solution, the activation signaling indicates a third antenna panel set and a fourth antenna panel set to be activated.

The activating module 61 is configured to ignore the activation signaling, and automatically activate the first antenna panel set and the second antenna panel set according to panel capability information.

The apparatus may further include:
a first sending module 62, configured to report the panel activation information of the first antenna panel set and the second antenna panel set.

Based on the above solution, the activation signaling indicates a part of the antenna panels in the first antenna panel set and the second antenna panel set to be activated.

The activating module 61 is configured to activate the part of the antenna panels in the first antenna panel set and the second antenna panel set indicated through the activation signaling, and automatically activate the other part of the antenna panels in the first antenna panel set and the second antenna panel set according to the panel capability information.

The apparatus may further include:
a first sending module 62, configured to report the panel activation information of the first antenna panel set and the second antenna panel set.

Based on the above solution, the apparatus may further include:
a reporting module, configured to report, before receiving the activation signaling that indicates the antenna panel set to be activated, the panel capability information of the antenna panel included.

The panel capability information indicates at least one of the following:
the number of antenna panels included;
when at least two antenna panels are included, whether the at least two antenna panels can be activated at the same time; or
when at least two antenna panels can be activated at the same time, whether to support the at least two activated antenna panels for simultaneous uplink transmission.

Based on the above solution, the activating module 61 is configured to automatically activate the first antenna panel set and the second antenna panel set according to the panel capability information.

The apparatus may further include:
a first sending module 62, configured to report the panel activation information of the first antenna panel set and the second antenna panel set.

Based on the above solution, the first antenna panel set and the second antenna panel set include at least one identical antenna panel which supports uplink transmission and downlink reception.

Based on the above solution, the apparatus may further include a first receiving module 63 and a first determining module.

The first receiving module 63 is configured to receive PDCCH signaling.

The first determining module is configured to determine a first antenna panel identifier of one of the first antenna panels for uplink transmission according to the PDCCH signaling.

Based on the above solution, the apparatus may further include:
a first receiving module 63, configured to receive the PDCCH signaling, the PDCCH signaling including indication information, and the indication information indicating first antenna panel identifiers of multiple first antenna panels for uplink transmission.

The second determining module is configured to determine one of the first antenna panels for uplink transmission according to the main antenna panel identifier indicated through at least one of physical layer signaling or high-level signaling, the physical layer signaling including the DCI signaling, and the high-level signaling including at least one of the MAC layer signaling or RRC signaling.

Based on the above solution, the second antenna panel set has multiple downlink reception configuration combinations.

The downlink reception configuration combination includes that:
a part of the second antenna panels are used for receiving at least one of downlink reference signal, downlink control channel signaling or downlink data, and the rest of the second antenna panels do not perform downlink reception;
or,
a part of the second antenna panels are used for receiving at least one of the downlink reference signal, the downlink control channel signaling or the downlink data, and the rest of the second antenna panels are used for receiving the downlink reference signal;
or,
all of the second antenna panels are used for receiving at least one of the downlink reference signal, the downlink control channel signaling or the downlink data.

Based on the above solution, the apparatus may further a transmitting module, configured to perform at least one of the following.

The PDCCH signaling is received using at least one of the second antenna panels, and uplink data is sent on the PUSCH using one of the first antenna panels.

The cell reference signal of the serving cell is received using at least one of the second antenna panels, and at least one of the beam measurement report or the channel state information measurement report is sent using one of the first antenna panels.

The downlink reference signal of at least one of the serving cell or neighboring cell is received using at least one of the second antenna panels, and the RRM measurement report is sent using one of the first antenna panels.

The PDCCH signaling is received and/or the PDSCH data is received using at least one of the second antenna panels, and the random access preamble is sent using one of the first antenna panels to the target cell for access.

The PDSCH data is received using at least one of the second antenna panels, and a Hybrid Automatic Repeat Request (HARQ) feedback for downlink reception data is sent using one of the first antenna panels.

The downlink reference signal is received using at least one of the second antenna panels, and the beam failure information is reported using one of the first antenna panels.

Figure 7:
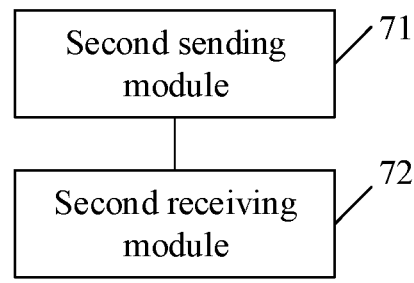
FIG. 7 is a block diagram of an antenna panel application apparatus according to one or more examples of the present disclosure.

As shown in FIG. 7, an example provides an antenna panel application apparatus, which includes a second sending module 71.

The second sending module 71 is configured to send activation signaling to the terminal, where the activation signaling indicates an antenna panel set to be activated by the terminal. The antenna panel set to be activated by the terminal includes: the first antenna panel set and the second antenna panel set. The first antenna panel set includes one or more first antenna panels used for uplink transmission, and the second antenna panel set includes one or more second antenna panels used for downlink reception.

In some examples, the second sending module 71 may be a program module, and the program module can send the activation signaling after being executed by a processor.

In some other examples, the second sending module 71 may be a combination module of software and hardware. The combination module of software and hardware includes, but is not limited to, the programmable array. The programmable array includes, but is not limited to, the complex programmable array or the FPGA.

In some other examples, the second sending module 71 may include: a pure hardware module. The pure hardware module includes, but is not limited to, the ASIC.

In some examples, the device may further include:
a second receiving module 72, configured to receive reported panel capability information of an antenna panel.

The second sending module 71 is configured to send the activation signaling according to the panel capability information.

In some examples, the activation signaling indicates the first antenna panel set and the second antenna panel set to be activated;

or, the activation signaling includes the first antenna panel set and the second antenna panel set to be activated;

or, the activation signaling indicates a part of antenna panels in the first antenna panel set and the second antenna panel set to be activated;

or, the activation signaling indicates a third antenna panel set and a fourth antenna panel set to be activated.

In some examples, the device may further include:

a second receiving module, configured to receive reported panel activation information of the activated antenna panel.

In some examples, the first antenna panel set and the second antenna panel set include at least one identical antenna panel which supports uplink transmission and downlink reception.

In some examples, the second sending module 71 is further configured to send PDCCH signaling that indicates a first antenna panel identifier of one of the first antenna panels for uplink transmission.

In some examples, the second sending module is further configured to send the PDCCH signaling, where the PDCCH signaling includes the indication information, and the indication information indicates first antenna panel identifiers of multiple first antenna panels for uplink transmission; and send at least one of the physical layer signaling or high-level signaling for indicating the main antenna panel identifier, the physical layer signaling including the DCI signaling, and the high-level signaling including at least one of the MAC layer signaling or the RRC signaling. The main antenna panel identifier and the first antenna panel identifier are used for determining one of the first antenna panel for uplink transmission.

Figure 8:
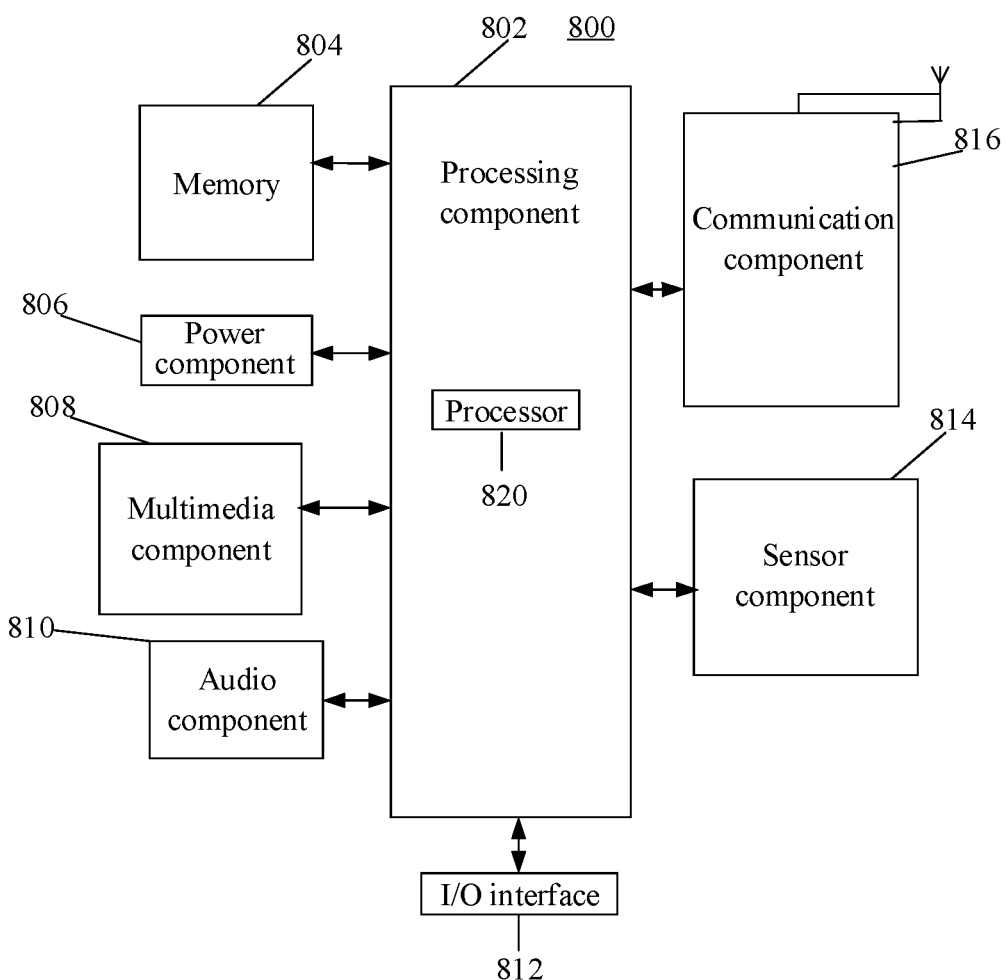
FIG. 8 is a block diagram of an antenna panel application apparatus according to one or more examples of the present disclosure.

FIG. 8 is a block diagram of an antenna panel application apparatus 800 according to an exemplary example. For example, the apparatus 800 may be a terminal. The terminal may be specifically a mobile phone, a computer, a digital broadcast terminal, a messaging device, a gaming console, a tablet, a medical device, exercise equipment and a personal digital assistant.

Referring to FIG. 8, the apparatus 800 may include one or more of the following components: a processing component 802, a memory 804, a power component 806, a multimedia component 808, an audio component 810, an Input/Output (I/O) interface 812, a sensor component 814, and a communication component 816.

The processing component 802 typically controls overall operations of the apparatus 800, such as the operations associated with display, telephone calls, data communications, camera operations, and recording operations. The processing component 802 may include one or more processors 820 to execute instructions to perform all or part of the steps in the above method. Moreover, the processing component 802 may include one or more modules which facilitate interaction between the processing component 802 and the other components. For instance, the processing component 802 may include a multimedia module to facilitate interaction between the multimedia component 808 and the processing component 802.

The memory 804 is configured to store various types of data to support the operation of the apparatus 800. Examples of such data include instructions for any application programs or methods operated on the apparatus 800, contact data, phonebook data, messages, pictures, video, etc. The memory 804 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 806 provides power for various components of the apparatus 800. The power component 806 may include a power management system, one or more power supplies, and other components associated with generation, management and distribution of power for the apparatus 800.

The multimedia component 808 includes a screen that provides an output interface between the apparatus 800 and a user. In some examples, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some examples, the multimedia component 808 includes a front camera and/or a rear camera. The front camera and/or the rear camera may receive external multimedia data when the apparatus 800 is in an operation mode, such as a photographing mode or a video mode. Each of the front camera and the rear camera may be a fixed optical lens system or have focusing and optical zooming capabilities.

The audio component 810 is configured to output and/or input an audio signal. For example, the audio component 810 includes a Microphone (MIC), and the MIC is configured to receive an external audio signal when the apparatus 800 is in the operation mode, such as a call mode, a recording mode and a voice recognition mode. The received audio signal may further be stored in the memory 804 or sent through the communication component 816. In some examples, the audio component 810 further includes a speaker configured to output the audio signal.

The I/O interface 812 provides an interface between the processing component 802 and a peripheral interface module, and the peripheral interface module may be a keyboard, a click wheel, a button and the like. The button may include, but not limited to: a home button, a volume button, a starting button and a locking button.

The sensor component 814 includes one or more sensors configured to provide status assessment in various aspects for the apparatus 800. For instance, the sensor component 814 may detect an on/off status of the apparatus 800 and relative positioning of components, such as a display and small keyboard of the apparatus 800, and the sensor component 814 may further detect a change in a position of the apparatus 800 or a component of the apparatus 800, presence or absence of contact between the user and the apparatus 800, orientation or acceleration/deceleration of the apparatus 800 and a change in temperature of the apparatus 800. The sensor component 814 may include a proximity sensor configured to detect presence of an object nearby without any physical contact. The sensor component 814 may also include a light sensor, such as a Complementary Metal Oxide Semiconductor (CMOS) or Charge Coupled Device (CCD) image sensor, configured for use in an imaging application. In some examples, the sensor component 814 may also include an acceleration sensor, a gyroscope sensor, a magnetic sensor, a pressure sensor or a temperature sensor.

The communication component 816 is configured to facilitate wired or wireless communication between the apparatus 800 and another device. The apparatus 800 may access a communication-standard-based wireless network, such as a WiFi network, a 2G or 3G network or a combination thereof. In an example, the communication component 816 receives a broadcast signal or broadcast associated information from an external broadcast management system through a broadcast channel. In an example, the communication component 816 further includes an NFC module to facilitate short-range communication. For example, the NFC module may be implemented based on a Radio Frequency Identification (RFID) technology, an Infrared Data Association (IrDA) technology, an Ultra-WideBand (UWB) technology, a Bluetooth (BT) technology and another technology.

In an example, the apparatus 800 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the above method.

In an example, there is also provided anon-transitory computer-readable storage medium including one or more instructions, such as the memory 804 including one or more instructions, and the one or more instructions may be executed by the processor 820 of the apparatus 800 to implement the abovementioned method. For example, the non-transitory computer-readable storage medium may be a ROM, a Random Access Memory (RAM), a Compact Disc Read-Only Memory (CD-ROM), a magnetic tape, a floppy disc, an optical data storage device and the like.

A non-transitory computer-readable storage medium is provided. When one or more instructions in the storage medium are executed by the processor of a mobile terminal, the mobile terminal can execute an antenna panel application method, as shown in FIG. 2 to FIG. 4. The method may specifically include that: the first antenna panel set and the second antenna panel set are activated. The first antenna panel set includes one or more first antenna panels used for uplink transmission. The second antenna panel set includes one or more second antenna panels used for downlink reception.

In some examples, the first antenna panel set and the second antenna panel set include at least one identical antenna panel which supports uplink transmission and downlink reception.

In some examples, the method may further include that: activation signaling sent by the base station is received. The activation signaling indicates the first antenna panel set and the second antenna panel set to be activated.

In some examples, the method may further include that: before the activation signaling sent by the base station is received, panel capability information of an antenna panel included in the terminal is reported to the base station. The panel capability information indicates at least one of the following:

the number of antenna panels included in the terminal;

when the terminal includes at least two antenna panels, whether the at least two antenna panels can be activated at the same time; or when the terminal can activate at least two antenna panels at the same time, whether to support the at least two activated antenna panels for simultaneous uplink transmission.

In some examples, the operation of activating the first antenna panel set and the second antenna panel set may include that: the first antenna panel set and the second antenna panel set are activated according to the activation signaling.

In some examples, the method may further include that: before receiving the activation signaling sent by the base station, the terminal automatically activates the first antenna panel set and the second antenna panel set according to panel capability information; and panel activation information of the first antenna panel set and the second antenna panel set are sent to the base station.

In some examples, the operation of activating the first antenna panel set and the second antenna panel set may include that: the activation signaling sent by the base station is received; the terminal shields the activation signaling, and automatically activates the first antenna panel set and the second antenna panel set according to the panel capability information; the panel activation information of the first antenna panel set and the second antenna panel set are reported to the base station.

In some examples, the method may further include that: the activation signaling sent by the base station is received; the first antenna panel set and the second antenna panel set include antenna panels indicated through the activation signaling; and the panel activation information of the first antenna panel set and the second antenna panel set are reported to the base station.

In some examples, the method may further include that: the PDCCH signaling is received; and a first antenna panel identifier of a first antenna panel for uplink transmission is determined according to the PDCCH signaling.

In some examples, the method may further include that: the PDCCH signaling is received, where the PDCCH signaling includes indication information, and the indication information indicates first antenna panel identifiers of multiple first antenna panels for uplink transmission.

One of the first antenna panels for uplink transmission is determined according to the main antenna panel identifier indicated through signaling sent by the base station. The signaling sent by the base station includes at least one of physical layer signaling or high-level signaling. The physical layer signaling includes DCI signaling, and the high-level signaling includes at least one of MAC layer signaling or RRC signaling.

PDCCH signaling.

In some examples, multiple second antenna panel configurations in the second antenna panel set have multiple downlink reception configuration combinations. The downlink reception configuration combination includes that: a part of the second antenna panels are used for receiving at least one of downlink reference signal, downlink control channel signaling or downlink data, and the rest of the second antenna panels do not perform downlink reception; or, a part of the second antenna panels are used for receiving at least one of the downlink reference signal, the downlink control channel signaling or the downlink data, and the rest of the second antenna panels are used for receiving the downlink reference signal; or, all of the second antenna panels are used for receiving at least one of the downlink reference signal, the downlink control channel signaling or the downlink data.

In some examples, the method may further include at least one of the following operations: the PDCCH signaling is received using at least one of the second antenna panels, and the uplink data is sent on the PUSCH using one of the first antenna panels; the cell reference signal of the serving cell is received using at least one of the second antenna panels, and at least one of the beam measurement report or the channel state information measurement report is sent using one of the first antenna panels; the downlink reference signal of at least one of the serving cell or neighboring cell is received using at least one of the second antenna panels, and the RRM measurement report is sent using one of the first antenna panels; the PDCCH signaling is received and/or the PDSCH data is received using at least one of the second antenna panels, and the random access preamble is sent using one of the first antenna panels to the target cell that the terminal accesses; the PDSCH data is received using at least one of the second antenna panels, and the HARQ feedback for downlink reception data is sent using one of the first antenna panels; or the downlink reference signal is received using at least one of the second antenna panels, and the beam failure information is reported using one of the first antenna panels.

Figure 9:
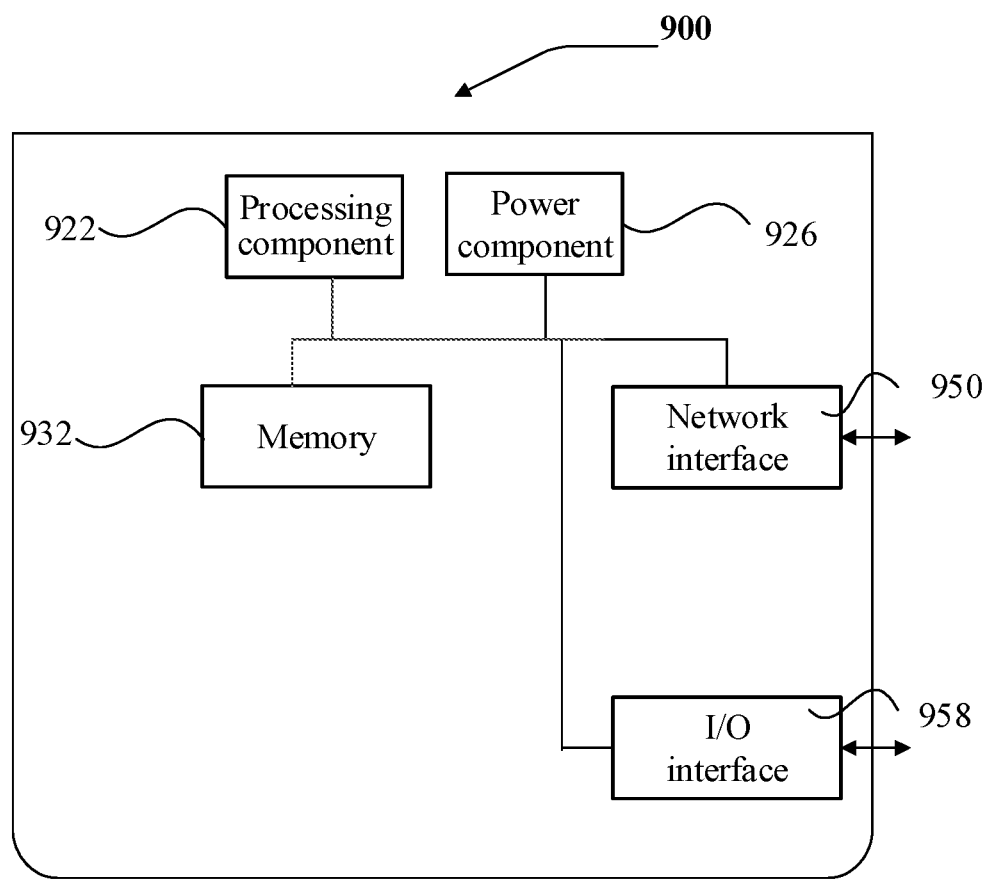
FIG. 9 is a block diagram of an antenna panel application apparatus according to one or more examples of the present disclosure.

FIG. 9 is a block diagram of an antenna panel application apparatus 900 according to an example. For example, the apparatus 900 may be provided as a base station. Referring to FIG. 9, the apparatus 900 includes a processing component 922 including one or more processors, and a memory resource represented by a memory 932, configured to store one or more instructions executable for the processing component 922, for example, an APP. The APP stored in the memory 932 may include one or more than one module of which each corresponds to a set of instructions. Here, the processing component 922 is configured to execute instructions to perform the antenna panel application method shown in FIG. 4 and/or FIG. 5.

The antenna panel application method includes that: activation signaling is sent. The activation signaling indicates a first antenna panel set and a second antenna panel set to be activated by a terminal. The first antenna panel set includes one or more first antenna panels for the terminal to perform uplink transmission, and the second antenna panel set includes one or more second antenna panels for the terminal to perform downlink reception.

In some examples, the first antenna panel set and the second antenna panel set include at least one identical antenna panel which supports uplink transmission and downlink reception.

In some examples, the method may further include that: panel capability information of an antenna panel reported by the terminal is received. The operation of sending the activation signaling to the terminal may include that the following operation.

The activation signaling is sent to the terminal according to the panel capability information.

In some examples, the method may further include that: panel activation information of an antenna panel activated by the terminal is received.

The device 900 may further include a power component 926 configured to execute power management of the device 900, a wired or wireless network interface 950 configured to connect the device 900 to a network and an I/O interface 958. The device 900 may be operated based on an operating system stored in the memory 932, for example, Windows Server™, Mac OS X™, Unix™, Linux™, FreeBSD™ or the like.

An example of the disclosure also provides an antenna panel application apparatus, which includes: a processor, a memory and an executable program stored in the memory and capable of being run by the processor. When running the executable program, the processor performs the antenna panel application method provided in any above technical solution, for example, at least one of the methods shown in FIG. 2 to FIG. 5.

The processor may be configured to be implemented by one or more ASICs, DSPs, PLDs, Complex Programmable Logic Devices (CPLDs), FPGAs, universal processors, controllers, Micro Controller Units (MCUs), Microprocessor Units (MPUs), or other electronic components, and is configured to execute the above method.

An example also provides a non-transitory computer-readable storage medium which stores an executable program. When executed by a processor, the executable program implements the antenna panel application method provided in any above technical solution, for example, at least one of the methods shown in FIG. 1 to FIG. 3 or FIG. 4 to FIG. 5.

A few specific examples are provided below in combination with any of the above examples.

EXAMPLE 1

The present example provides an antenna panel application method in a terminal, which may include the following operation.

When activating the antenna panel of the terminal, the base station explicitly activates the first antenna panel set including at least one first antenna panel for downlink reception, and explicitly activates the second antenna panel set including at least one second antenna panel for uplink transmission.

The first antenna panel and the second antenna panel may be the same or different. If there is only one second antenna panel, when the terminal receives the PDCCH signaling on the first antenna panel, the PDCCH signaling does not need to indicate which antenna panel is used for uplink transmission, but only needs to indicate a time-frequency resource for uplink transmission.

If activation is performed by the base station, the base station needs to send the activation signaling to the terminal, and the terminal activates the first antenna panel set and the second antenna panel set based on the received activation signaling.

If activation is performed by the terminal itself, the terminal needs to send an identifier of the activated antenna panel to the base station. Or, the base station initiates the activation signaling first, and the terminal may either follow the activation signaling of the base station or not, and then the terminal informs the base station through the panel activation information which antenna panels are activated.

Before the base station sends the activation signaling, the terminal needs to report its own antenna panel capability information, such as the number of antenna panels included, whether the antenna panels may be activated at the same time, and if they can be activated at the same time, whether they can be used for uplink transmission at the same time.

EXAMPLE 2

The present example provides an antenna panel application method in a terminal, which may include the following operation.

When activating the antenna panel of the terminal, the base station does not explicitly indicate whether the activated antenna panel is used for downlink reception or uplink transmission, however, if the base station activates multiple antenna panels, the multiple antenna panels may be used for simultaneous reception, but only one antenna panel is used for uplink transmission at the same time.

If activation is performed by the base station, the activation signaling needs to be sent to the terminal. If activation is performed by the terminal itself, the terminal needs to send the panel activation information like the identifier of the activated antenna panel to the base station. Or, the base station initiates the activation signaling first, and the terminal may either follow the activation signaling of the base station or not, and then the terminal informs the base station through the panel activation information which antenna panels are activated.

Before the base station sends the activation signaling, the terminal needs to report the panel capability information of its antenna panel, and informs, by reporting the panel capability information, the base station of at least one of the following information:

the number of antenna panels included; whether the antenna panels may be activated at the same time; or if they can be activated at the same time, whether they can be used for uplink transmission at the same time.

EXAMPLE 3

Based on example 1 and example 2, the present example provides a transmission configuration method after the antenna panel is activated. There are also many configuration combinations for the antenna panel for downlink reception, which are specifically as follows.

A configuration combination is that the terminal is configured to use one antenna panel for downlink reception, and the antenna panel for downlink reception may be the same as or different from the antenna panel for uplink transmission. Downlink information that the terminal is configured to need to receive on other antenna panels may be that:

the antenna panel in the second antenna panel set does not receive any downlink data or control signaling or reference signal during uplink transmission of one first antenna panel;

or, during uplink transmission of one first antenna panel, the second antenna panel only receives the downlink reference signals, such as the SSB, the NZP CSI-RS, and the DRS.

In this case, the terminal uses one antenna panel to receive the PDCCH signaling. The PDCCH signaling carries the indication information indicating which uplink antenna panel and which time-frequency resource the terminal uses for uplink transmission. In this way, the PDCCH signaling may dynamically indicate different uplink antenna panels for transmission.

Another configuration combination is that the base station configures the terminal to receive the downlink reference signals, such as the SSB, the NZP CSI-RS, the DRS and the PDCCH, on multiple antenna panels.

In this case, the PDCCH signaling on each antenna panel schedules resources of PDSCH or PUSCH/PRACH/PUCCH on the antenna panel, so if the PDCCH signaling schedules PUSCH/PRACH/PUCCH transmission on an antenna panel, uplink is sent on this antenna panel. The terminal does not expect to receive the PDCCH signaling on multiple antenna panels indicating multiple antenna panels to perform uplink transmission simultaneously. If the terminal receives the signaling, the terminal performs uplink transmission only on the main antenna panel according to the indication of the RRC signaling.

The contents of downlink reception and uplink transmission may be, but are not limited to, the following.

The downlink reception may be one or a combination of the following:

reception of downlink reference signals, such as the SSB, the NZP CSI-RS, and the DRS, and RSRP and RSRQ measurement of L1-RSRP/SINR or RRM;

monitoring of the PDCCH;

reception of the PDSCH.

The uplink transmission may be one or a combination of the following: PRACH, PUCCH, PUSCH and SRS.

A typical combination is that:

the second antenna panel receives the PDCCH signaling on downlink, and the first antenna panel sends the PUSCH data on uplink.

The second antenna panel receives a serving cell reference signal on downlink and performs beam measurement or CSI measurement. The first antenna panel sends an uplink beam measurement report or CSI measurement report. (The beam measurement reports or CSI measurement reports obtained from multiple antenna panels are reported to the base station using a PUCCH resource.)

The second antenna panel receives the serving cell reference signal or neighboring cell reference signal on downlink and performs RRM measurement. The first antenna panel sends the RRM measurement report on uplink.

The second antenna panel receives a serving cell PDCCH on downlink and detects a Block Error Ratio (BLER). The first antenna panel reports a beam failure on uplink.

The second antenna panel receives the serving cell reference signal and the neighboring cell reference signal on downlink and performs the RRM measurement, and the first antenna panel sends the random access preamble on uplink to the target cell to be switched. In this way, multiple antenna panels for downlink reception simultaneously measure multiple neighboring cells to ensure that more neighboring cells can be measured and more accurate measurement result can be obtained. After a suitable target cell is found based on the measurement results, an antenna panel is used to send the random access preamble to the target cell, so that the transmission power of the terminal is concentrated on the antenna panel, thereby improving the success rate of random access. At the same time, one antenna panel receives data of the serving cell on downlink, while another antenna panel may send the random access preamble to the target cell, thus ensuring the seamless switch, that is, when initiating random access to the target cell, the terminal also maintains connection with the serving cell to reduce the interruption time of data transmission caused by the switch.

The second antenna panel receives the PDSCH of the serving cell on downlink, and the first antenna panel sends on uplink the HARQ ACK/NACK feedback for the PDSCH received on downlink. In this way, the HARQ feedback of data received by multiple antenna panels is sent on one PUCCH, which reduces the HARQ feedback delay while saving the PUCCH resource.

One or more antenna panels may be used to receive on downlink at the same time, but there is only one antenna panel sent on uplink at the same time.

Before activating the antenna panel of the terminal, the base station receives the panel capability information sent by the terminal, so as to know an antenna panel capability level of the terminal. It is determined that multiple antenna panels in the terminal may be activated at the same time, but only one antenna panel is used for transmission at the same time.

In the disclosure, by configuring the terminal that supports multiple antenna panels but has only one antenna panel for uplink transmission at the same time, including the configuration of the antenna panel and the configuration of the downlink and uplink resources, the transmission efficiency between the terminal and the base station is improved.

The disclosure provides an antenna panel application method and apparatus, and a storage medium.

An antenna panel application method is provided, which includes the following operation.

A first antenna panel set and a second antenna panel set are activated.

The first antenna panel set includes one or more first antenna panels used for uplink transmission.

The second antenna panel set includes one or more second antenna panels used for downlink reception.

Based on the above solution, the method may further include the following operation.

Activation signaling that indicates an antenna panel set to be activated is received.

Based on the above solution, the activation signaling indicates the first antenna panel set and the second antenna panel set to be activated.

The operation of activating the first antenna panel set and the second antenna panel set may include the following operation.

The first antenna panel set and the second antenna panel set indicated in the activation signaling are activated.

Based on the above solution, the activation signaling includes the first antenna panel set and the second antenna panel set to be activated.

The operation of activating the first antenna panel set and the second antenna panel set may include the following operation.

The first antenna panel set and the second antenna panel set indicated in the activation signaling are activated.

The method may further include the following operation.

Panel activation information of the first antenna panel set and the second antenna panel set is reported.

Based on the above solution, the activation signaling indicates a third antenna panel set and a fourth antenna panel set to be activated.

The operation of activating the first antenna panel set and the second antenna panel set may include the following operation.

The activation signaling is ignored, and the first antenna panel set and the second antenna panel set are automatically activated according to panel capability information.

The method may further include the following operation.

The panel activation information of the first antenna panel set and the second antenna panel set is reported.

Based on the above solution, the activation signaling indicates a part of antenna panels in the first antenna panel set and the second antenna panel set to be activated.

The operation of activating the first antenna panel set and the second antenna panel set may include the following operation.

The part of the antenna panels in the first antenna panel set and the second antenna panel set indicated through the activation signaling are activated, and the other part of the antenna panels in the first antenna panel set and the second antenna panel set are automatically activated according to panel capability information.

The method may further include the following operation.

The panel activation information of the first antenna panel set and the second antenna panel set is reported.

Based on the above solution, the method may further include the following operation.

Before the activation signaling that indicates the antenna panel set to be activated is received, panel capability information of the antenna panel included is reported.

The panel capability information indicates at least one of the following:
  the number of antenna panels included;
  when at least two antenna panels are included, whether the at least two antenna panels can be activated at the same time; or
  when at least two antenna panels can be activated at the same time, whether to support the at least two activated antenna panels for simultaneous uplink transmission.

Based on the above solution, the operation of activating the first antenna panel set and the second antenna panel set may include the following operation.

The first antenna panel set and the second antenna panel set are automatically activated according to the panel capability information.

The method may further include the following operation.

The panel activation information of the first antenna panel set and the second antenna panel set is reported.

Based on the above solution, the first antenna panel set and the second antenna panel set include at least one identical antenna panel which supports uplink transmission and downlink reception.

Based on the above solution, the method may further include the following operations.

Physical Downlink Control Channel (PDCCH) signaling is received.

A first antenna panel identifier of one of the first antenna panels for uplink transmission is determined according to the PDCCH signaling.

Based on the above solution, the method may further include the following operations.

The PDCCH signaling is received, the PDCCH signaling including indication information, and the indication information indicating first antenna panel identifiers of multiple first antenna panels for uplink transmission.

One of the first antenna panels for uplink transmission is determined according to a main antenna panel identifier indicated through at least one of physical layer signaling or high-level signaling, the physical layer signaling including: Downlink Control Information (DCI) signaling, and the high-level signaling including at least one of Media Access Control (MAC) layer signaling or Radio Resource Control (RRC) signaling.

Based on the above solution, the second antenna panel set has multiple downlink reception configuration combinations.

The downlink reception configuration combination includes that:
  a part of the second antenna panels are used for receiving at least one of downlink reference signal, downlink control channel signaling or downlink data, and the rest of the second antenna panels do not perform downlink reception;
  or,
  a part of the second antenna panels are used for receiving at least one of the downlink reference signal, the downlink control channel signaling or the downlink data, and the rest of the second antenna panels are used for receiving the downlink reference signal;

or,
   all of the second antenna panels are used for receiving at least one of the downlink reference signals, the downlink control channel signaling or the downlink data.

Based on the above solution, the method may further include at least one of the following operations.

The PDCCH signaling is received using at least one of the second antenna panels, and uplink data is sent on a Physical Uplink Shared Channel (PUSCH) using one of the first antenna panels.

A cell reference signal of a serving cell is received using at least one of the second antenna panels, and at least one of a beam measurement report or a channel state information measurement report is sent using one of the first antenna panels.

The downlink reference signal of at least one of the serving cell or neighboring cell is received using at least one of the second antenna panels, and a Radio Resource Management (RRM) measurement report is sent using one of the first antenna panels.

The PDCCH signaling is received and/or Physical Downlink Shared Channel (PDSCH) data is received using at least one of the second antenna panels, and a random access preamble is sent using one of the first antenna panels to a target cell for access.

The PDSCH data is received using at least one of the second antenna panels, and a Hybrid Automatic Repeat Request (HARQ) feedback for downlink reception data is sent using one of the first antenna panels.

The downlink reference signal is received using at least one of the second antenna panels, and beam failure information is reported using one of the first antenna panels.

An antenna panel application method is provided, which includes the following operation.

Activation signaling that indicates an antenna panel set to be activated is sent. The activated antenna panel sets include: a first antenna panel set and a second antenna panel set. The first antenna panel set includes one or more first antenna panels used for uplink transmission, and the second antenna panel set includes one or more second antenna panels used for downlink reception.

Based on the above solution, the method may further include the following operation.

The reported panel capability information of the antenna panel is received.

The operation of sending the activation signaling may include the following operation.

The activation signaling is sent according to the panel capability information.

Based on the above solution, the activation signaling indicates the first antenna panel set and the second antenna panel set to be activated;
or,
   the activation signaling includes the first antenna panel set and the second antenna panel set to be activated;
or,
   the activation signaling indicates a part of antenna panels in the first antenna panel set and the second antenna panel set to be activated;
or,
   the activation signaling indicates a third antenna panel set and a fourth antenna panel set to be activated.

Based on the above solution, the method may further include the following operation.

The reported panel activation information of the activated antenna panel is received.

Based on the above solution, the first antenna panel set and the second antenna panel set include at least one identical antenna panel which supports uplink transmission and downlink reception.

Based on the above solution, the method may further include the following operation.

The PDCCH signaling is sent, the PDCCH signaling indicating the first antenna panel identifier of one of the first antenna panels for uplink transmission.

Based on the above solution, the method may further include the following operations.

The PDCCH signaling is sent, the PDCCH signaling including indication information, and the indication information indicating first antenna panel identifiers of multiple first antenna panels for uplink transmission.

At least one of physical layer signaling or high-level signaling for indicating the main antenna panel identifier is sent, the physical layer signaling including the DCI signaling, and the high-level signaling including at least one of the MAC layer signaling or RRC signaling. The main antenna panel identifier and the first antenna panel identifier are used for determining one of the first antenna panels for uplink transmission.

An antenna panel application apparatus is provided, which includes:
   an activating module, configured to activate a first antenna panel set and a second antenna panel set.

The first antenna panel set includes one or more first antenna panels used for uplink transmission.

The second antenna panel set includes one or more second antenna panels used for downlink reception.

Based on the above solution, the apparatus may further include:
   a first receiving module, configured to receive activation signaling that indicates an antenna panel set to be activated.

Based on the above solution, the activation signaling indicates the first antenna panel set and the second antenna panel set to be activated.

The activating module is configured to activate the first antenna panel set and the second antenna panel set indicated in the activation signaling.

Based on the above solution, the activation signaling includes the first antenna panel set and the second antenna panel set to be activated.

The activating module is configured to activate the first antenna panel set and the second antenna panel set indicated in the activation signaling.

The apparatus may further include:
   a first sending module, configured to report panel activation information of the first antenna panel set and the second antenna panel set.

Based on the above solution, the activation signaling indicates the third antenna panel set and the fourth antenna panel set to be activated.

The activating module is configured to ignore the activation signaling, and automatically activate the first antenna panel set and the second antenna panel set according to panel capability information.

The apparatus may further include:
   a first sending module, configured to report panel activation information of the first antenna panel set and the second antenna panel set.

Based on the above solution, the activation signaling indicates a part of the antenna panels in the first antenna panel set and the second antenna panel set to be activated.

The activating module is configured to activate the part of the antenna panels in the first antenna panel set and the second antenna panel set indicated through the activation signaling, and automatically activate the other part of the antenna panels in the first antenna panel set and the second antenna panel set according to the panel capability information.

The apparatus may further include:
a first sending module, configured to report panel activation information of the first antenna panel set and the second antenna panel set.

Based on the above solution, the apparatus may further include:
a reporting module, configured to report, before receiving the activation signaling that indicates the antenna panel set to be activated, the panel capability information of the antenna panel included.

The panel capability information indicates at least one of the following:
the number of antenna panels included;
when at least two antenna panels are included, whether the at least two antenna panels can be activated at the same time; or
when at least two antenna panels can be activated at the same time, whether to support the at least two activated antenna panels for simultaneous uplink transmission.

Based on the above solution, the activating module is configured to automatically activate the first antenna panel set and the second antenna panel set according to the panel capability information.

The apparatus may further include:
a first sending module, configured to report the panel activation information of the first antenna panel set and the second antenna panel set.

Based on the above solution, the first antenna panel set and the second antenna panel set include at least one identical antenna panel which supports uplink transmission and downlink reception.

Based on the above solution, the apparatus may further include: a first receiving module and a first determining module.

The first receiving module is configured to receive the PDCCH signaling.

The first determining module is configured to determine a first antenna panel identifier of one of the first antenna panels for uplink transmission according to the PDCCH signaling.

Based on the above solution, the apparatus may further include: a first receiving module and a first determining module.

The first receiving module is configured to receive the PDCCH signaling, the PDCCH signaling including the indication information, and the indication information indicating first antenna panel identifiers of multiple first antenna panels for uplink transmission.

The second determining module is configured to determine one of the first antenna panels for uplink transmission according to the main antenna panel identifier indicated through at least one of the physical layer signaling or the high-level signaling, the physical layer signaling including the DCI signaling, and the high-level signaling including at least one of the MAC layer signaling or RRC signaling.

Based on the above solution, the second antenna panel set has multiple downlink reception configuration combinations.

The downlink reception configuration combinations include that:
a part of the second antenna panels are used for receiving at least one of downlink reference signal, downlink control channel signaling or downlink data, and the rest of the second antenna panels do not perform downlink reception;
or,
a part of the second antenna panels are used for receiving at least one of the downlink reference signal, the downlink control channel signaling or the downlink data, and the rest of the second antenna panels are used for receiving the downlink reference signal;
or,
all the second antenna panels are used for receiving at least one of the downlink reference signal, the downlink control channel signaling or the downlink data.

Based on the above solution, the apparatus may further a transmitting module, configured to perform at least one of the following.

The PDCCH signaling is received using at least one of the second antenna panels, and the uplink data is sent on the PUSCH using one of the first antenna panels.

The cell reference signal of the serving cell is received using at least one of the second antenna panels, and at least one of the beam measurement report or the channel state information measurement report is sent using one of the first antenna panels.

The downlink reference signal of at least one of the serving cell or neighboring cell is received using at least one of the second antenna panels, and the RRM measurement report is sent using one of the first antenna panels.

The PDCCH signaling is received and/or the PDSCH data is received using at least one of the second antenna panels, and the random access preamble is sent using one of the first antenna panels to the target cell for access.

The PDSCH data is received using at least one of the second antenna panels, and the HARQ feedback for the downlink reception data is sent using one of the first antenna panels.

The downlink reference signal is received using at least one of the second antenna panels, and the beam failure information is reported using one of the first antenna panels.

An antenna panel application apparatus is provided, which includes:
a second sending module, configured to send activation signaling that indicates an antenna panel set to be activated. The activated antenna panel set include: the first antenna panel set and the second antenna panel set. The first antenna panel set includes one or more first antenna panels used for uplink transmission, and the second antenna panel set includes one or more second antenna panels used for downlink reception.

Based on the above solution, the apparatus may further include a second receiving module and a second sending module.

The second receiving module is configured to receive reported panel capability information of an antenna panel.

The second sending module is configured to send the activation signaling according to the panel capability information.

Based on the above solution, the activation signaling indicates the first antenna panel set and the second antenna panel set to be activated;
or,
the activation signaling includes the first antenna panel set and the second antenna panel set to be activated;

or,
the activation signaling indicates a part of the antenna panels in the first antenna panel set and the second antenna panel set to be activated;
or,
the activation signaling indicates a third antenna panel set and a fourth antenna panel set to be activated.

Based on the above solution, the apparatus may further include:
a second receiving module, configured to receive the reported panel activation information of the activated antenna panel.

Based on the above solution, the first antenna panel set and the second antenna panel set include at least one identical antenna panel which supports uplink transmission and downlink reception.

Based on the above solution, the second sending module is further configured to send the PDCCH signaling, the PDCCH signaling indicating the first antenna panel identifier of one of the first antenna panels for uplink transmission.

Based on the above solution, the second sending module is further configured to send the PDCCH signaling, the PDCCH signaling including the indication information, and the indication information indicating first antenna panel identifiers of multiple first antenna panels for uplink transmission, and send at least one of the physical layer signaling or high-level signaling for indicating the main antenna panel identifier, the physical layer signaling including the DCI signaling, and the high-level signaling including at least one of the MAC layer signaling or the RRC signaling. The main antenna panel identifier and the first antenna panel identifier are used for determining one of the first antenna panel for uplink transmission.

A data transmission apparatus includes a processor, a memory and an executable program stored in the memory and capable of being run by the processor. When running the executable program, the processor performs the antenna panel application method provided in any above solution.

A non-transitory computer-readable storage medium stores an executable program. When executed by a processor, the executable program implements the steps of the antenna panel application method provided in any above solution.

The technical solutions provided in the examples of the disclosure may have the following beneficial effects.

A terminal will activate the first antenna panel set and the second antenna panel set respectively. One or more first antenna panels included in the first antenna panel set are activated for uplink transmission, and one or more second antenna panels included in the second antenna panel set are activated for downlink reception. In this way, the terminal can not only activate multiple antenna panels simultaneously to realize transmission in different beam directions; at the same time, by dividing the first antenna panel set and the second antenna panel set, whether the activated antenna panel is used for uplink transmission or downlink reception is determined in advance, which has the following characteristics compared with randomly selecting the activated antenna panel for uplink transmission or downlink reception.

On one hand, the problem of a large transmission delay caused by that too many or all activated antenna panels are occupied in a certain transmission direction (for example, uplink or downlink), resulting in no antenna panels available for transmission in the other transmission direction can be reduced, and uplink and/or downlink transmission efficiency is improved.

On the other hand, the method provided in the examples may reduce phenomena that one or a few antenna panels are selected for uplink transmission and downlink reception, so that the selected antenna panel is heavily loaded, and the effective utilization rate of resources of the antenna panel is low and the load of the antenna panel is unbalanced caused by the limit of the unselected antenna panel, improve the overall effective utilization rate of the antenna panel in the terminal, and improve the load balancing rate of the antenna panel.

Other implementation solutions of the disclosure will be apparent to those skilled in the art from consideration of the specification and practice of the disclosure. This disclosure is intended to cover any variations, uses, or adaptations of the disclosure following the general principles thereof and including such departures from the disclosure as come within known or customary practice in the art. The specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes may be made without departing from the scope thereof. The scope of the disclosure is limited only by the appended claims.

What is claimed is:

1. An antenna panel application method, comprising:
activating, by a terminal, a first antenna panel set and a second antenna panel set,
wherein the first antenna panel set comprises one or more first antenna panels for uplink transmission, and the second antenna panel set comprises one or more second antenna panels for downlink reception,
wherein the first antenna panel set and the second antenna panel set comprise at least one identical antenna panel which supports the uplink transmission and the downlink reception, and
wherein activating, by the terminal, the first antenna panel set and the second antenna panel set comprises:
automatically activating, by the terminal, the first antenna panel set and the second antenna panel set according to panel capability information.

2. The method of claim 1, further comprising:
receiving, by the terminal, activation signaling that indicates an antenna panel set to be activated.

3. The method of claim 2, wherein the activation signaling indicates a third antenna panel set and a fourth antenna panel set to be activated, and
wherein automatically activating, by the terminal, the first antenna panel set and the second antenna panel set further comprises:
ignoring, by the terminal, the activation signaling, and automatically activating, by the terminal, the first antenna panel set and the second antenna panel set according to the panel capability information.

4. The method of claim 2, wherein the activation signaling indicates a part of antenna panels in the first antenna panel set and the second antenna panel set to be activated, and
wherein automatically activating, by the terminal, the first antenna panel set and the second antenna panel set comprises:
activating, by the terminal, the part of the antenna panels in the first antenna panel set and the second antenna panel set indicated through the activation signaling, and automatically activating, by the terminal, the other part of the antenna panels in the first antenna panel set and the second antenna panel set according to the panel capability information.

5. The method of claim 2, further comprising:
before receiving, by the terminal, the activation signaling that indicates the antenna panel set to be activated, reporting, by the terminal, the panel capability information of an antenna panel comprised in the antenna panel set, wherein the panel capability information indicates at least one of following:
a number of antenna panels comprised in the antenna panel set;
when the antenna panel set comprises at least two antenna panels, whether the at least two antenna panels can be activated at the same time; or
when the at least two antenna panels can be activated at the same time, whether to support the at least two activated antenna panels for simultaneous uplink transmission.

6. The method of claim 1, wherein the method further comprises:
reporting, by the terminal, panel activation information of the first antenna panel set and the second antenna panel set.

7. The method of claim 1, further comprising:
receiving, by the terminal, Physical Downlink Control Channel (PDCCH) signaling; and
determining, by the terminal, a first antenna panel identifier of one of the first antenna panels for the uplink transmission according to the PDCCH signaling.

8. The method of claim 1, further comprising:
receiving, by the terminal, Physical Downlink Control Channel (PDCCH) signaling, wherein the PDCCH signaling comprises indication information, and the indication information indicates first antenna panel identifiers of a plurality of first antenna panels for the uplink transmission; and
determining, by the terminal, one of the first antenna panels for the uplink transmission according to a main antenna panel identifier indicated through at least one of physical layer signaling or high-level signaling, wherein the physical layer signaling comprises Downlink Control Information (DCI) signaling, and the high-level signaling comprises at least one of Media Access Control (MAC) layer signaling or Radio Resource Control (RRC) signaling.

9. The method of claim 1, wherein the second antenna panel set has a plurality of downlink reception configuration combinations, wherein the downlink reception configuration combinations comprise one of the following:
a part of the second antenna panels are used for receiving at least one of downlink reference signal, downlink control channel signaling or downlink data, and the rest of the second antenna panels do not perform the downlink reception;
a part of the second antenna panels are used for receiving at least one of downlink reference signal, downlink control channel signaling or downlink data, and the rest of the second antenna panels are used for receiving the downlink reference signal; or
all of the second antenna panels are used for receiving at least one of downlink reference signal, downlink control channel signaling, or downlink data.

10. The method of claim 1, further comprising at least one of the following:
receiving, by the terminal, Physical Downlink Control Channel (PDCCH) signaling using at least one of the second antenna panels, and sending uplink data on a Physical Uplink Shared Channel (PUSCH) using one of the first antenna panels;
receiving, by the terminal, a cell reference signal of a serving cell using at least one of the second antenna panels, and sending at least one of a beam measurement report or a channel state information measurement report using one of the first antenna panels;
receiving, by the terminal, a downlink reference signal of at least one of the serving cell or neighboring cell using at least one of the second antenna panels, and sending a radio resource management measurement report using one of the first antenna panels;
receiving, by the terminal, at least one of the PDCCH signaling or Physical Downlink Shared Channel (PDSCH) data using at least one of the second antenna panels, and sending, using one of the first antenna panels, a random access preamble to a target cell for access;
receiving, by the terminal, the PDSCH data using at least one of the second antenna panels, and sending a Hybrid Automatic Repeat Request (HARD) feedback for the downlink reception data using one of the first antenna panels; or
receiving, by the terminal, the downlink reference signal using at least one of the second antenna panels, and reporting beam failure information using one of the first antenna panels.

11. A terminal, comprising: a processor, a memory and an executable program stored in the memory and capable of being run by the processor, wherein when running the executable program, the processor performs operations comprising:
activating a first antenna panel set and a second antenna panel set;
wherein the first antenna panel set comprises one or more first antenna panels used for uplink transmission, and the second antenna panel set comprises one or more second antenna panels used for downlink reception, and
wherein activating the first antenna panel set and the second antenna panel set comprises:
automatically activating the first antenna panel set and the second antenna panel set according to panel capability information, and
wherein the first antenna panel set and the second antenna panel set comprise at least one identical antenna panel which supports the uplink transmission and the downlink reception.

12. An antenna panel application method, comprising:
sending, by a base station, activation signaling to a terminal, wherein the activation signaling indicates an antenna panel set to be activated, in a manner that the terminal activates a first antenna panel set and a second antenna panel set, the first antenna panel set comprising one or more first antenna panels for uplink transmission, the second antenna panel set comprising one or more second antenna panels for downlink reception, and the first antenna panel set and the second antenna panel set comprising at least one identical antenna panel which supports the uplink transmission and the downlink reception, and
wherein the first antenna panel set and the second antenna panel set are activated automatically according to panel capability information.

13. The method of claim 12, further comprising:
receiving, by the base station, reported panel capability information of an antenna panel;
wherein sending the activation signaling comprises:
sending, by the base station, the activation signaling according to the panel capability information.

14. The method of claim 12, wherein one of the following applies:
the activation signaling indicates a part of antenna panels in the first antenna panel set and the second antenna panel set to be activated; or
the activation signaling indicates a third antenna panel set and a fourth antenna panel set to be activated.

15. The method of claim 12, further comprising:
receiving, by the base station, reported panel activation information of an activated antenna panel.

16. The method of claim 12, further comprising:
sending, by the base station, Physical Downlink Control Channel (PDCCH) signaling, wherein the PDCCH signaling indicates a first antenna panel identifier of one of the first antenna panels for the uplink transmission.

17. A non-transitory computer-readable storage medium having stored therein an executable program that, when executed by a processor, causes the processor to perform the antenna panel application method of claim 1.

* * * * *